(12) United States Patent
Poe et al.

(10) Patent No.: US 11,945,929 B2
(45) Date of Patent: Apr. 2, 2024

(54) MACROPOROUS-STRUCTURED POLYMER AEROGELS

(71) Applicant: BLUESHIFT MATERIALS, INC., Spencer, MA (US)

(72) Inventors: Garrett Poe, Uxbridge, MA (US); Alan Sakaguchi, San Marcos, TX (US); Michael Merwin, San Marcos, TX (US); Kenneth Koldan, San Marcos, TX (US); David J. Irvin, San Marcos, TX (US)

(73) Assignee: BLUESHIFT MATERIALS, INC., Spencer, MA (US)

( * ) Notice: Subject to any disclaimer, the term of this patent is extended or adjusted under 35 U.S.C. 154(b) by 776 days.

(21) Appl. No.: 16/609,132

(22) PCT Filed: Apr. 26, 2018

(86) PCT No.: PCT/US2018/029591
§ 371 (c)(1),
(2) Date: Oct. 28, 2019

(87) PCT Pub. No.: WO2018/200827
PCT Pub. Date: Nov. 1, 2018

(65) Prior Publication Data
US 2020/0199323 A1 Jun. 25, 2020

Related U.S. Application Data

(60) Provisional application No. 62/508,494, filed on May 19, 2017, provisional application No. 62/491,813, filed on Apr. 28, 2017.

(51) Int. Cl.
*C08J 9/28* (2006.01)
*C08G 73/10* (2006.01)
(Continued)

(52) U.S. Cl.
CPC .......... *C08J 9/283* (2013.01); *C08G 73/1032* (2013.01); *C08G 73/1042* (2013.01);
(Continued)

(58) Field of Classification Search
CPC ............. B01J 13/0091; C08G 73/1032; C08G 73/1042; C08G 73/1071; C08J 2201/0482;
(Continued)

(56) References Cited

U.S. PATENT DOCUMENTS

2003/0060519 A1  3/2003  Poco et al.
2016/0272777 A1  9/2016  Lee et al.
(Continued)

FOREIGN PATENT DOCUMENTS

CN   101698592   4/2010
CN   103285789   9/2013
(Continued)

OTHER PUBLICATIONS

Office Action issued in Corresponding Chinese Application No. 201880044039.X, dated Jul. 26, 2021 (English Translation provided).
(Continued)

*Primary Examiner* — Lynda Salvatore
(74) *Attorney, Agent, or Firm* — NORTON ROSE FULBRIGHT US LLP

(57) ABSTRACT

A macroporous-structured polymeric aerogel, and methods for making and using the same, having a polymeric matrix that includes macropores is disclosed.

18 Claims, 6 Drawing Sheets

(51) Int. Cl.
  *C08J 5/18*   (2006.01)
  *D06N 3/00*   (2006.01)
(52) U.S. Cl.
  CPC ............ *C08G 73/1071* (2013.01); *C08J 5/18* (2013.01); *D06N 3/0006* (2013.01); *D06N 3/0009* (2013.01); *D06N 3/0011* (2013.01); *D06N 3/0043* (2013.01); *C08J 2201/0482* (2013.01); *C08J 2201/0502* (2013.01); *C08J 2205/026* (2013.01); *C08J 2205/044* (2013.01); *C08J 2379/08* (2013.01)
(58) Field of Classification Search
  CPC .......... C08J 2201/0502; C08J 2205/026; C08J 2205/044; C08J 2379/08; C08J 5/18; C08J 9/28; C08J 9/283; D06N 3/0006; D06N 3/0009; D06N 3/0011; D06N 3/0043
  See application file for complete search history.

(56) References Cited

U.S. PATENT DOCUMENTS

2017/0355829 A1* 12/2017 Sakaguchi ........... B01J 13/0091
2018/0001576 A1   1/2018 Koebel et al.

FOREIGN PATENT DOCUMENTS

| CN | 105705231 | 6/2016 | | |
|---|---|---|---|---|
| EP | 3 053 952 | 8/2016 | | |
| WO | WO 2015/065557 | * | 5/2015 | ............ C08G 12/08 |
| WO | WO 2018140804 | 8/2018 | | |

OTHER PUBLICATIONS

Search Report issued in Corresponding Chinese Application No. 201880044039.X, dated Jul. 20, 2021 (English Translation provided).

International Search Report and Written Opinion issued in Corresponding International Patent Application No. PCT/US2018/029591, dated Jun. 28, 2018.

Communication Pursuant to Article 94(3) EPC for EP 187270855, dated Jan. 21, 2022.

Kim et al., "One-step synthesis of nano-porous monolithic polyimide aerogel", Microporous and Mesoporous Materials 234, 2016, pp. 35-42.

* cited by examiner

MACROPOROUS-STRUCTURED POLYMER AEROGELS

CROSS-REFERENCE TO RELATED APPLICATIONS

This application is a national phase application under 35 U.S.C. § 371 of International Application No. PCT/US2018/029591, filed Apr. 26, 2018, which claims the benefit of U.S. Provisional Application No. 62/508,494 filed May 19, 2017 and U.S. Provisional Application No. 62/491,813 filed Apr. 28, 2017. The contents of the referenced applications are incorporated into the present application by reference.

BACKGROUND OF THE INVENTION

A. Field of the Invention

The present disclosure relates to the field of polymeric aerogels. In particular, the invention concerns a polymeric aerogel that can be structured such that the majority of the pore volume in the aerogels are made up of macropores (pores having a size of greater than 50 nm in diameter).

B. Description of Related Art

A gel by definition is a sponge-like, three-dimensional solid network whose pores are filled with another non-gaseous substance, such as a liquid. The liquid of the gel is not able to diffuse freely from the gel structure and remains in the pores of the gel. Drying of the gel that exhibits unhindered shrinkage and internal pore collapse during drying provides materials commonly referred to as xerogels.

By comparison, a gel that dries and exhibits little or no shrinkage and internal pore collapse during drying can yield an aerogel. Aerogels are generally characterized as having high porosity, with the majority of the pore volume being made up of micropores (pores having a size of less than 2 nm in diameter) and/or mesopores (pores having a size of 2 nm to 50 nm in diameter), high specific surface area, and relatively low densities. High porosity can confer a number of useful properties to aerogels, including high surface area, low refractive index, low dielectric constant, low thermal-loss coefficient, and low sound velocity. While mesoporous and/or microporous structured aerogels have useful properties, they can be difficult to prepare from both an economic and a complexity perspective. In particular, such structured aerogels can have a propensity to collapse during processing (in particular, during the drying stage that removes the liquid phase of the intermediate gel), resulting in xerogels. Therefore, an inordinate amount of time and expense can be focused on the drying stage of aerogel processing.

Furthermore, conventional aerogels having mesoporous and/or microporous structured matrices can lack mechanical durability. This lack of durability can have a negative impact on production scale-up, large scale manufacturing, conformation to irregular surfaces, or maintaining integrity in dynamic conditions. Therefore, flexibility, compressibility, integrity, durability, strength, and resistance to tearing are all areas for potential improvement in aerogels.

SUMMARY OF THE INVENTION

A discovery has been made that provides an aerogel with improved manufacturability and recyclability over conventional aerogels. The discovery is premised on an aerogel that is structured to include macropores (e.g., pores having a size of greater than 50 nm in diameter, greater than 50 nm to 5000 nm, preferably 100 nm to 2000 nm, more preferably 250 nm to 2000 nm, even more preferably 500 nm to 1400 nm, and most preferably about 1200 nm) in its polymeric matrix. It was surprisingly found that the presence of macropores can help facilitate the manufacture of aerogels as macropores are larger than meso- and micropores and less likely to collapse during the drying stage of manufacturing. This can result in a more economically efficient and less complicated drying process, thereby allowing for a more commercially scalable process when compared with known mesoporous and/or microporous structured aerogels. Additionally, the presence of macropores can improve any one of or all of the flexibility, strength, gas permeation, and/or the strength to density ratio of the formed aerogels.

In one aspect of the invention, macroporous-structured polymeric aerogels are described. A macroporous-structured polymeric aerogel can include a polymeric matrix that includes macropores. At least 10% of the aerogel's pore volume is made up of macropores. In some preferred embodiments, the majority (e.g., more than 50%) of the pore volume in the aerogels of the present invention can be made up from macropores. In even further instances, over 55%, 60%, 70%, 80%, 90%, 95%, 99%, or 100% of the pore volume of the aerogels can be made up of macropores. In instances where less than 100% of the pore volume are macropores, such aerogels can also include mesopores and/or micropores. For example, aerogels of the present invention can include macropores, a combination of macropores and mesopores, a combination of macropores and micropores, or a combination of macropores, mesopores, and micropores. Less than 90, %, 80%, 70%, 60%, 50%, 40%, 30% 20%, 10% or less than 5% of the aerogel's pore volume can include micropores and/or mesopores. The average pore size of the pores present in the polymeric matrix of the aerogels of the present invention can be greater than 50 nm in diameter, greater than 50 nm to 5000 nm in diameter. The pore size of the aerogel can be designed to meet the application. In some embodiments, the aerogel average pore size (diameter) can be greater than 50 nm, greater than 50 nm to 5000 nm, preferably 250 nm to 2000 nm, more preferably 500 nm to 2000 nm, even more preferably 1000 nm to 1400 nm, and most preferably about 1200 nm. In certain embodiments, the average pore size can be greater than 50 nm in diameter, greater than 50 nm to 1000 nm, preferably 100 nm to 800 nm, more preferably 250 nm to 750 nm. This macroporous architecture is believed to contribute to the improved manufacturability and recyclability properties of the aerogels of the present invention, while also providing improved mechanical properties when compared with conventionally structured mesoporous and/or microporous aerogels.

In one particular non-limiting aspect, a method of making an aerogel having macropores can include: (a) providing a monomer or a combination of monomers to a solvent to form a solution; (b) polymerizing the monomers in the solution to form a polymer solution and/or a resulting polymer gel matrix; and (c) subjecting the polymer gel matrix to conditions sufficient to remove liquid from the gel matrix to form an aerogel having a polymeric open-cell structured matrix with macropores present in the matrix. In one preferred and non-limiting aspect, the formation of macropores versus smaller mesopores and micropores can be primarily controlled by controlling the polymer/solvent dynamics during gel formation. By doing so, the pore structure can be controlled, and the quantity and volume of macroporous, mesoporous, and microporous cells can be controlled. In one instance, this can be done by adding a curing agent to the solution to reduce the solubility of polymers formed in the solution and to form macropores in the gel matrix, the formed macropores containing liquid from the solution. For example, a curing additive (e.g., 1,4-diazabicyclo[2.2.2] octane) that can reduce the solubility of the polymers being formed during polymerization step (b), can produce a polymer gel containing a higher number of macropores compared to another curing additive (e.g., triethylamine) that improves the resultant polymer solubility. In another specific non-limiting example when forming a polyimide aerogel having macropores, increasing the ratio of rigid amines incorporated into the polymer backbone such as p-phenylenediamine (p-PDA) as compared to more flexible diamines such as 4,4'-oxydianiline (4,4'-ODA), the formation of macropores as compared to smaller mesopores and micropores can be controlled. More specifics about the monomers and solvents and processing conditions are provided below in the Detailed Description and Examples section of the present specification. In more general terms, the following processing variables/conditions can be used to favor the formation of macropores versus mesopores and/or micropores: (1) the polymerization solvent; (2) the polymerization temperature; (3) the polymer molecular weight; (4) the molecular weight distribution; (5) the copolymer composition; (6) the amount of branching; (7) the amount of crosslinking; (8) the method of branching; (9) the method of crosslinking); (10) the method used in formation of the gel; (11) the type of catalyst used to form the gel; (12) the chemical composition of the catalyst used to form the gel; (13) the amount of the catalyst used to form the gel; (14) the temperature of gel formation; (15) the type of gas flowing over the material during gel formation; (16) the rate of gas flowing over the material during gel formation; (17) the pressure of the atmosphere during gel formation; (18) the removal of dissolved gasses during gel formation; (19) the presence of solid additives in the resin during gel formation; (20) the amount of time of the gel formation process; (21) the substrate used for gel formation; (22) the type of solvent or solvents used in each step of the optional solvent exchange process; (23) the composition of solvent or solvents used in each step of the optional solvent exchange process; (24) the amount of time used in each step of the optional solvent exchange process; (25) the dwell time of the part in each step of the solvent exchange process; (26) the rate of flow of the optional solvent exchange solvent; (27) the type of flow of the optional solvent exchange solvent; (28) the agitation rate of the optional solvent exchange solvent; (29) the temperature used in each step of the optional solvent exchange process; (30) the ratio of the volume of optional solvent exchange solvent to the volume of the part; (31) the method of drying; (32) the temperature of each step in the drying process; (33) the pressure in each step of the drying process; (34) the composition of the gas used in each step of the drying process; (35) the rate of gas flow during each step of the drying process; (36) the temperature of the gas during each step of the drying process; (37) the temperature of the part during each step of the drying process; (38) the presence of an enclosure around the part during each step of the drying process; (39) the type of enclosure surrounding the part during drying; and/or (40) the solvents used in each step of the drying process.

In another embodiment of the present invention, the inventors have discovered that a support material (e.g., films, layers, fibers, etc.) can be incorporated into the aerogels of the present invention. The support material can serve as an internal reinforcement of the aerogel and help further increase the material strength, flex fatigue, tear resistance, and other mechanical properties of the resulting aerogel. Still further, the beneficial thermal and acoustic insulation properties of the aerogels can be preserved. The use of the support material with the macroporous aerogels of the present invention is an optional feature. Therefore, macroporous structured aerogels with and without such support material are contemplated in the context of the present invention. In embodiments where a support material is used, the support material can at least partially penetrate the aerogel. Such an internally reinforced aerogel can be obtained in which the support can be integrated with the aerogel without the use of any external adhesive to adhere the support to the aerogel. In certain aspects, the internally reinforced aerogel specifically excludes the use of any adhesives. In further aspects, the support fully penetrates the aerogel and is positioned approximately equal distance from the top and bottom edges the aerogel, or is positioned anywhere in between the outer edges of the support. In certain aspects, the support partially penetrates the aerogel (with the aerogel also penetrating the support) and with a portion of the support being position outside or aligned with an outer edge of the aerogel. A reinforced aerogel of the present invention can be formed by forming an aerogel having macropores on the surface of a support film, which can result in a supported aerogel, and rolling the supported aerogel to form an internally reinforced aerogel, where the rolling results in the pressing of the support into the aerogel thin film. In other aspects, the support can be incorporated into the aerogel by spin coating, solvent casting, or spraying an aerogel thin film or an aerogel precursor solution on, around, and/or within the support.

In some aspects, article of manufactures are disclosed. An article of manufacture can include the macroporously structured aerogels of the present invention. The aerogels can optionally be reinforced with the aforementioned support material. In some embodiments, the article of manufacture can be a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus. In some particular embodiments, the aerogels can be included in an antenna, sunshield, sunscreen, a radome, or a filter.

In some aspects of the present invention, filtration methods using any one of the macroporously structured aerogels of the present invention are disclosed. A method can include filtering a fluid using any one of the macroporously structured aerogels of the present invention. The fluid can contain impurities and/or desired substances. The method can include contacting a feed fluid with the aerogel under conditions sufficient to remove at least a portion of the impurities and/or desired substances from the feed fluid and produce a filtrate. In some instances, the aerogel can be in the form of a film, powder, blanket, or a monolith. In some instances, the feed fluid used in the methods disclosed herein can be a liquid, a gas, a supercritical fluid, or a mixture thereof. The feed fluid can contain water ($H_2O$) and/or be a non-aqueous liquid. The non-aqueous fluid can be an oil, a solvent, or any combination thereof. In some instances, the feed fluid can be a solvent (e.g., an organic solvent). The feed fluid can be an emulsion (e.g., a water-oil emulsion, an oil-water emulsion, a water-solvent emulsion, a solvent-water emulsion, an oil-solvent emulsion, or a solvent-oil emulsion). The feed fluid can be a biological fluid (e.g., blood, plasma, or both). The feed fluid can be a gas (e.g., air, nitrogen, oxygen, an inert gas, or mixtures thereof). In some instances, the filtrate can be substantially free of impurities and/or a desired substance.

In some aspects, the present disclosure provides a system for filtering a fluid that includes impurities and/or desired substances. The system can include any one of the aerogels of the present invention and a separation zone in fluid communication with the aerogel, a feed fluid, and a filtrate.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions of the invention can be used to achieve methods of the invention.

In one instance, 66 embodiments of the present invention are described. Embodiment 1 describes a macroporous-structured polymeric aerogel having a polymeric matrix that includes macropores. Embodiment 2 is the macroporous-structured aerogel of embodiment 1, wherein at least 10% of the aerogel's pore volume is made up of macropores. Embodiment 3 is the macroporous-structured aerogel of embodiment 1, wherein at least 50% of the aerogel's pore volume is made up of macropores. Embodiment 4 is the macroporous-structured aerogel of embodiment 1, wherein at least 75% of the aerogel's pore volume is made up of macropores. Embodiment 5 is the macroporous-structured aerogel of embodiment 1, wherein at least 95% of the aerogel's pore volume is made up of macropores. Embodiment 6 is the macroporous-structured aerogel of any one of embodiments 1 to 5, wherein the polymeric matrix further comprises micropores or mesopores or both micropores and mesopores. Embodiment 7 is the macroporous-structured aerogel of embodiment 6, wherein less than 90, %, 80%, 70%, 60%, 50%, 40%, 30% 20%, 10% or less than 5% of the aerogel's pore volume is made up of micropores and/or mesopores. Embodiment 8 is the macroporous-structured aerogel of embodiment 1, wherein 100% of the aerogel's pore volume is made up of macropores. Embodiment 9 is the macroporous-structured aerogel of any one of embodiments 1 to 8, wherein the polymeric matrix has an average pore size of greater than 50 nanometers (nm) to 5000 nm in diameter. Embodiment 10 is the macroporous-structured aerogel of embodiment 9, wherein the polymeric matrix has an average pore size of 1000 nm to 1400 nm in diameter. Embodiment 11 is the macroporous-structured aerogel of embodiment 9, wherein the polymeric matrix has an average pore size of 100 to 500 nm, preferably about 300 nm in diameter. Embodiment 12 is the macroporous-structured aerogel of any one of embodiments 1 to 11, wherein the aerogel is a polyimide aerogel. Embodiment 13 is the macroporous-structured aerogel of any one of embodiments 1 to 12, wherein the aerogel is at 25 to 50 mm thick. Embodiment 13 is the macroporous-structured aerogel of any one of embodiments 1 to 13, wherein the aerogel is between 0.01 to 1000 mm thick. Embodiment 15 is the macroporous-structured aerogel of any one of embodiments 1 to 14, further comprising a support film at least partially penetrating the polymer matrix of the aerogel. Embodiment 16 is the macroporous-structured aerogel of embodiment 15, wherein the aerogel does not include an adhesive or binder to attach the support film to the polymeric matrix. Embodiment 17 is the macroporous-structured aerogel of any one of embodiments 15 to 16, wherein the support film fully penetrates the aerogel. Embodiment 18 is the macroporous-structured aerogel of embodiment 17, wherein the support film is positioned approximately equal distance from the top and bottom edges the aerogel. Embodiment 19, is the macroporous-structured aerogel of any one of embodiments 15 to 18, wherein the support film is a fiber support. Embodiment 20 is the macroporous-structured aerogel of embodiment 19, wherein the fiber support comprises fibers having an average filament cross sectional area of 7 or 800 $\mu m^2$. Embodiment 21 is the macroporous-structured aerogel of any one of embodiments 19 to 20, wherein the fiber support is 0.05 mm or less in thickness. Embodiment 22 is the macroporous-structured aerogel of any one of embodiments 19 to 20, wherein the fiber support is between 0.001 and 0.05 mm thick. Embodiment 23 is the macroporous-structured aerogel of any one of embodiments 19 to 22, wherein the fiber support is a woven fiber support. Embodiment 24 is the macroporous-structured aerogel of any one of embodiments 19 to 22, wherein the fiber support is a knitted fiber support. Embodiment 25 is the macroporous-structured aerogel of any one of embodiments 19 to 22, wherein the fiber support is a non-woven fiber support. Embodiment 26 is the macroporous-structured aerogel of embodiment 25, wherein the fiber support is a paper support. Embodiment 27 is the macroporous-structured aerogel of any one of embodiments 25 to 26, wherein the fiber support comprises unidirectional fibers. Embodiment 28 is the macroporous-structured aerogel of any one of embodiments 25 to 27, wherein the fiber support comprises omnidirectional fibers. Embodiment 29 is the macroporous-structured aerogel of any one of embodiments 25 to 28, wherein the fiber support comprises fibers with an aspect ratio of less than 60. Embodiment 30 is the macroporous-structured aerogel of any one of embodiments 25 to 29, wherein the fiber support comprises fibers with an aspect ratio of greater than 60. Embodiment 31 is the macroporous-structured aerogel of any one of embodiments 25 to 30, wherein the fiber support comprises microfibers. Embodiment 32 is the macroporous-structured aerogel of any one of embodiments 19 to 31, wherein the fiber support comprises natural, synthetic, semi-synthetic fibers, or combinations thereof. Embodiment 33 is the macroporous-structured aerogel of any one of embodiments 19 to 31, wherein the fiber support comprises vegetable, wood, animal, mineral, biological fibers, or combinations thereof. Embodiment 34 is the macroporous-structured aerogel of any one of embodiments 19 to 31, wherein the fiber support comprises rayon, bamboo, diacetate, triacetate fibers, or combinations thereof. Embodiment 35 is the macroporous-structured aerogel of any one of embodiments 19 to 31, wherein the fiber support comprises metal, carbon, carbide, glass, mineral fibers, or combinations thereof. Embodiment 36 is the macroporous-structured aerogel of any one of embodiments 19 to 35, wherein the fiber support comprises thermoplastic polymer fibers, thermoset polymer fibers, or combinations thereof. Embodiment 17 is the macroporous-structured aerogel of embodiments 36, wherein the thermoplastic fiber is a fiber of polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), polyester, polyamides, co-polymers thereof, or blends thereof. Embodiment 38 is the macroporous-structured aerogel of any one of embodiments 36 to 37, wherein the thermoset fiber is a fiber of polyaramid, polyimide, polybenzoxazole, polyurethane, or blends thereof. Embodiment 39 is the macroporous-structured aerogel of embodiment 19, wherein the fiber support is a vinylon, polyolefin, polyethylene or polyester fiber support. Embodiment 40 is the macroporous-structured aerogel of embodiment 19, wherein the fiber support is a vinylon support. Embodiment 41 is the macroporous-structured aerogel of any one of embodiments 1 to 40, having a flex fatigue of at least 100,000 cycles to failure. Embodiment 42 is the macroporous-structured aerogel of any one of embodiments 1 to 41, having a tensile strength of at least 15 MPa.

Embodiment 43 is a method of making the macroporous-structured aerogel of any one of embodiments 1 to 42, the method comprising: (a) providing a monomer or a combination of monomers to a solvent to form a solution; (b) polymerizing the monomers in the solution to form a polymer gel matrix; and (c) subjecting the polymer gel matrix to conditions sufficient to remove liquid from the polymer gel matrix to form an aerogel having macropores present in the aerogel matrix. Embodiment 44 is the method of embodiment 43, wherein step (b) further comprises adding a curing agent to the solution to reduce the solubility of polymers formed in the solution and to form macropores in the gel matrix, the formed macropores containing liquid from the solution. Embodiment 45 is the method of any one of embodiments 43 to 44, the method further comprising: covering or immersing a support film in the solution in step (a) or (b) such that the support film is attached to the resulting polymer gel matrix and ultimately to the produced aerogel matrix.

Embodiment 46 is an article of manufacture comprising the macroporous-structured aerogel of any one of embodiments 1 to 42. Embodiment 47 is the article of manufacture of embodiment 46, wherein the article of manufacture is a thin film, monolith, wafer, blanket, core composite material, a substrate for radiofrequency antenna, substrate for a sunshield, a substrate for a sunshade, a substrate for radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus, or any combination thereof. Embodiment 48 is the article of manufacture of embodiment 46, wherein the article of manufacture is an antenna. Embodiment 49 is the article of manufacture of embodiment 46, wherein the article of manufacture is a sunshield or sunscreen. Embodiment 50 is the article of manufacture of embodiment 46, wherein the article of manufacture is a radome. Embodiment 51 is the article of manufacture of embodiment 46, wherein the article of manufacture is a filter.

Embodiment 52 is a method of filtering a fluid comprising impurities and/or desired substances, the method comprising contacting a feed fluid with the macroporous-structured aerogel of any one of embodiments 1 to 42 under conditions sufficient to remove at least a portion of the impurities and/or desired substances from the feed fluid and produce a filtrate. Embodiment 53 is the method of embodiment 52, wherein the feed fluid is a liquid, a gas, a supercritical fluid, or a mixture thereof. Embodiment 54 is the method of any one of embodiments 52 to 53, wherein the feed fluid comprises water. Embodiment 55 is the method of any one of embodiments 52 to 53, wherein the feed fluid is a non-aqueous liquid. Embodiment 56 is the method of embodiment 55, wherein the non-aqueous fluid is an oil, a solvent, or combinations thereof. Embodiment 57 is the method of embodiment 55, wherein the feed fluid is a solvent. Embodiment 58 is the method of embodiment 57, wherein the feed fluid is an organic solvent. Embodiment 59 is the method of any one of embodiments 52 to 58, wherein the feed fluid is an emulsion. Embodiment 60 is the method of embodiment 59, wherein the emulsion is a water-oil emulsion, an oil-water emulsion, a water-solvent emulsion, a solvent-water emulsion, an oil-solvent emulsion, or a solvent-oil emulsion. Embodiment 61 is the method of embodiment 52, wherein the feed fluid is a biological fluid. Embodiment 62 is the method of embodiment 61, wherein the biological fluid is blood, plasma, or both. Embodiment 63 is the method of embodiment 52, wherein the feed fluid is a gas. Embodiment 64 is the method of embodiment 63, wherein the gas comprises air, nitrogen, oxygen, an inert gas, or mixtures thereof. Embodiment 65 is the method of any one of embodiments 52 to 64, wherein the filtrate is substantially free of impurities and/or a desired substance. Embodiment 66 is a filtration system comprising: (a) the macroporous-structured aerogel of any one of embodiments 1 to 42; and (b) a separation zone in fluid communication with the aerogel, a feed fluid and a filtrate.

The following includes definitions of various terms and phrases used throughout this specification.

The term "aerogel" refers to a class of materials that are generally produced by forming a gel, removing a mobile interstitial solvent phase from the pores, and then replacing it with a gas or gas-like material. By controlling the gel and evaporation system, density, shrinkage, and pore collapse can be minimized. In the context of the present invention, aerogels have macropores. Aerogels of the present invention can also include mesopores and/or micropores. In preferred aspects, the majority (e.g., more than 50%) of the aerogel's pore volume can be made up of macropores. Macroporously structured polyimide aerogels of the present invention can also include mesopores and/or micropores or can consist only of macropores. In other alternative aspects, the majority of the aerogel's pore volume can be made up of mesopores and/or micropores such that less than 50% of the aerogel's pore volume can be made up of macropores. In some embodiments, the aerogels of the present invention can have low bulk densities (about 0.75 g/cm³ or less, preferably about 0.01 to 0.5 g/cm³), high surface areas (generally from about 10 to 1,000 m²/g and higher, preferably about 50 to 1000 m²/g), high porosity (about 20% and greater, preferably greater than about 85%), and/or relatively large pore volume (more than about 0.3 mL/g, preferably about 1.2 mL/g and higher).

The presence of macropores, mesopores, and/or micropores in the aerogels of the present invention can be determined by mercury intrusion porosimetry (MIP) and/or gas physisorption experiments. The MIP test can be used to measure mesopores and macropores (i.e., American Standard Testing Method (ASTM) D4404-10, Standard Test Method for Determination of Pore Volume and Pore Volume Distribution of Soil and Rock by Mercury Intrusion Porosimetry). Gas physisorption experiments can be used to measure micropores (i.e., ASTM D1993-03(2008) Standard Test Method for Precipitated Silica—Surface Area by Multipoint BET Nitrogen).

The term "non-woven" is defined as material made of fibers that does not have a woven or interlaced architecture using continuous fibers. However, the non-woven fibrous region of the supports of the present invention may have some inadvertent cross-over of some of the individual filaments, such cross-over does not change the non-woven structure of the fibrous region and is not a designed continuous aspect of the material.

The terms "impurity" or "impurities" refers to unwanted substances in a feed fluid that are different than a desired filtrate and/or are undesirable in a filtrate. In some instances, impurities can be solid, liquid, gas, or supercritical fluid. In some embodiments, an aerogel can remove some or all of an impurity.

The term "desired substance" or "desired substances" refers to wanted substances in a feed fluid that are different than the desired filtrate. In some instances, the desired substance can be solid, liquid, gas, or supercritical fluid. In some embodiments, an aerogel can remove some or all of a desired substance.

The term "radio frequency (RF)" refers to the region of the electromagnetic spectrum having wavelengths ranging from $10^{-4}$ to $10^7$ m.

The use of the word "a" or "an" when used in conjunction with the terms "comprising," "including," "containing," or "having" in the claims and/or the specification may mean "one," but it is also consistent with the meaning of "one or more," "at least one," and "one or more than one."

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The use of the term "or" in the claims is used to mean "and/or" unless explicitly indicated to refer to alternatives only or the alternatives are mutually exclusive, although the disclosure supports a definition that refers to only alternatives and "and/or."

The terms "wt. %," "vol. %," or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The aerogels and processes of making and using the aerogels of the present invention can "comprise," "consist essentially of," or "consist of" particular ingredients, components, compositions, steps, etc., disclosed throughout the specification. With respect to the transitional phase "consisting essentially of," in one non-limiting aspect, a basic and novel characteristic of the macroporously structured aerogels of the present invention is the presence of macropores in the polymeric matrix of the aerogel, preferably where at least 50% of the aerogel's pore volume is made up of macropores.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

Figure 1:
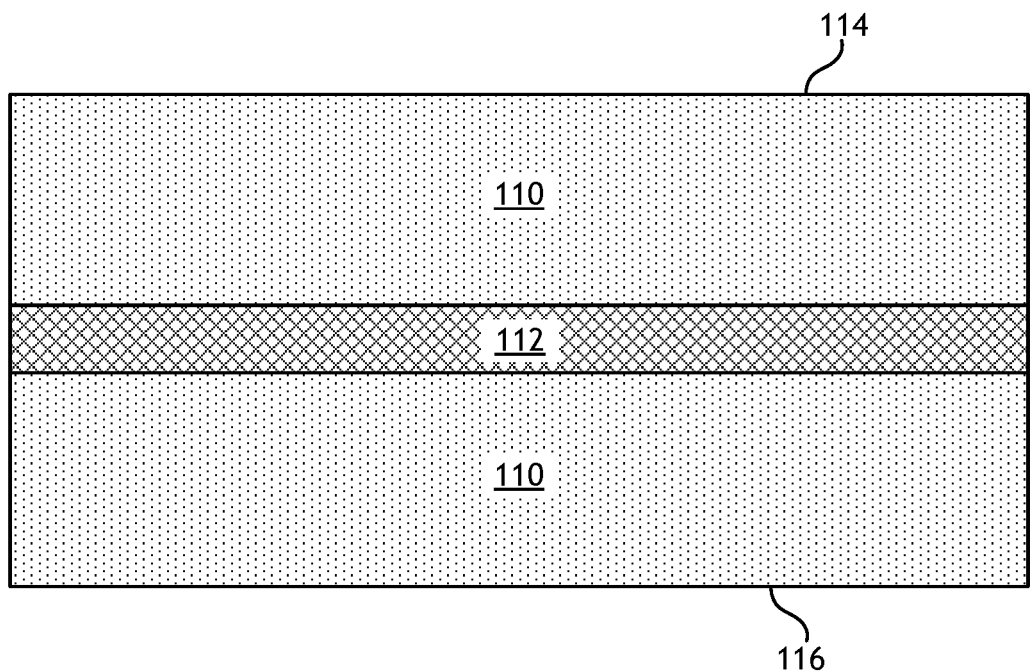
FIG. 1 is an illustration of an embodiment of an internally reinforced aerogel having the support positioned at about the midline of the aerogel.

While the invention is susceptible to various modifications and alternative forms, specific embodiments thereof are shown by way of example in the drawings and may herein be described in detail. The drawings may not be to scale.

DETAILED DESCRIPTION

A discovery has been made that provides a macroporous structured polymeric aerogel with improved manufacturability and processability over conventional mesoporous and/or microporous structured polymeric aerogels. The macroporously structured aerogels of the present invention can include an open cell polymeric matrix that includes macropores. Notably, the amount of macropores present in the aerogels can be tuned or controlled to a desired amount. For example, aerogels can be produced where 5, 10, 15, 20, 25, 30, 35, 40, 45, 50, 55, 60, 65, 70, 75, 80, 85, 90, 95, 99, or 100% of the aerogel's pore volume can be made up of macropores. In instances wherein less than 100% of the aerogel's pore volume is derived from macropores, such aerogels can include mesopores and/or micropores. The average pore size of the pores present in the polymeric matrix of the aerogels of the present invention can be greater than 50 nm in diameter or greater than 50 nm up to 5000 nm in diameter. In a non-limiting example, a stock shaped macroporously structured aerogel can have an average pore diameter of 100 nm to 2000 nm, more preferably 500 nm to 2000 nm, even more preferably 1000 nm to 1400 nm, and most preferably about 1200 nm. In another non-limiting example, a macroporously structured aerogel film can have an average pore diameter greater than 50 nm in diameter, greater than 50 nm to 400 nm, preferably 100 nm to 500 nm, more preferably 150 nm to 300 nm. The macroporously structured aerogel can be any thickness or have any shape. In some embodiments, the aerogel is a film or a molded shaped. By way of example, the macroporous-structured aerogel can be 0.01 to 1000 mm thick or at least, equal to, or between any two of 0.01, 0.1, 1, 10, 25, 50, 75, 100, 150, 200, 250, 300, 350, 400, 450, 500, 550, 600, 650, 700, 750, 800, 850, 900, 950, and 1000 mm.

These and other non-limiting aspects of the present invention are discussed in further detail in the following sections.

A. Polymeric Aerogels

The polymeric aerogel matrix of the present invention include organic materials, inorganic materials, or a mixture thereof, and have matrices that include macropores. The aerogels or wet gels used to prepare the aerogels may be prepared by any known gel-forming techniques, for example adjusting the pH and/or temperature of a dilute metal oxide sol to a point where gelation occurs. Organic aerogels can be made from polyacrylates, polystyrenes, polyacrylonitriles, polyurethanes, polyimides, polyamides, polyaramids, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, agarose, and the like. In particular embodiments the aerogel is a polyimide aerogel.

Polyimides are a type of polymer with many desirable properties. Polyimide polymers include a nitrogen atom in the polymer backbone, where the nitrogen atom is connected to two carbonyl carbons, such that the nitrogen atom is somewhat stabilized by the adjacent carbonyl groups. A carbonyl group includes a carbon, referred to as a carbonyl carbon, which is double bonded to an oxygen atom. Polyimides are usually considered an AA-BB type polymer because usually two different classes of monomers are used to produce the polyimide polymer. Polyimides can also be prepared from AB type monomers. For example, an aminodicarboxylic acid monomer can be polymerized to form an AB type polyimide. Monoamines and/or mono anhydrides can be used as end capping agents if desired.

One class of polyimide monomer is usually a diamine, or a diamine monomer. The diamine monomer can also be a diisocyanate, and it is to be understood that an isocyanate could be substituted for an amine in this description, as appropriate. There are other types of monomers that can be used in place of the diamine monomer, as known to those skilled in the art. The other type of monomer is called an acid monomer, and is usually in the form of a dianhydride. In this description, the term "di-acid monomer" is defined to include a dianhydride, a tetraester, a diester acid, a tetracarboxylic acid, or a trimethylsilyl ester, all of which can react with a diamine to produce a polyimide polymer. Dianhydrides are to be understood as tetraesters, diester acids, tetracarboxylic acids, or trimethylsilyl esters that can be substituted, as appropriate. There are also other types of monomers that can be used in place of the di-acid monomer, as known to those skilled in the art.

Because one di-acid monomer has two anhydride groups, different diamino monomers can react with each anhydride group so the di-acid monomer may become located between two different diamino monomers. The diamine monomer contains two amine functional groups; therefore, after the first amine functional group attaches to one di-acid monomer, the second amine functional group is still available to attach to another di-acid monomer, which then attaches to another diamine monomer, and so on. In this manner, the polymer backbone is formed. The resulting polycondensation reaction forms a polyamic acid.

The polyimide polymer is usually formed from two different types of monomers, and it is possible to mix different varieties of each type of monomer. Therefore, one, two, or more di-acid monomers can be included in the reaction vessel, as well as one, two or more diamino monomers. The total molar quantity of di-acid monomers is kept about the same as the total molar quantity of diamino monomers if a long polymer chain is desired. Because more than one type of diamine or di-acid can be used, the various monomer constituents of each polymer chain can be varied to produce polyimides with different properties. For example, a single diamine monomer AA can be reacted with two di-acid co monomers, $B_1B_1$ and $B_2B_2$, to form a polymer chain of the general form of $(AA-B_1B_1)_x-(AA-B_2B_2)_y$, in which x and y are determined by the relative incorporations of $B_1B_1$ and $B_2B_2$ into the polymer backbone. Alternatively, diamine co-monomers $A_1A_1$ and $A_2A_2$ can be reacted with a single di-acid monomer BB to form a polymer chain of the general form of $(A_1A_1-BB)_x-(A_2A_2-BB)_y$. Additionally, two diamine co-monomers $A_1A_1$ and $A_2A_2$ can be reacted with two di-acid co-monomers $B_1B_1$ and $B_2B_2$ to form a polymer chain of the general form $(A_1A_1-B_1B_1)_w-(A_1A_1-B_2B_2)_x-(A_2A_2-B_1B_1)_y-(A_2A_2-B_2B_2)_z$, where w, x, y, and z are determined by the relative incorporation of $A_1A_1$-$B_1B_1$, $A_1A_1$-$B_2B_2$, $A_2A_2$-$B_1B_1$, and $A_2A_2$-$B_2B_2$ into the polymer backbone. More than two di-acid co-monomers and/or more than two diamine co-monomers can also be used. Therefore, one or more diamine monomers can be polymerized with one or more di-acids, and the general form of the polymer is determined by varying the amount and types of monomers used.

There are many examples of monomers that can be used to make the aerogel polymer compositions containing polyamic amide polymer of the present invention. In some embodiments, the diamine monomer is a substituted or unsubstituted aromatic diamine, a substituted or unsubstituted alkyldiamine, or a diamine that can include both aromatic and alkyl functional groups. A non-limiting list of possible diamine monomers comprises 4,4'-oxydianiline (ODA), 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenyl sulfones, 1,3-bis-(4-aminophenoxy)benzene, 1,3-bis-(3-aminophenoxy)benzene, 1,4-bis-(4-aminophenoxy)benzene, 1,4-bis-(3-aminophenoxy)benzene, 2,2-bis[4-(4-aminophenoxy)phenyl]-hexafluoropropane, 2,2-bis(3-aminophenyl)-1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis-[4-(4-aminophenoxy)phenyl]sulfones, 2,2-bis[4-(3-aminophenoxy)phenyl]sulfones, bis(4-[4-aminophenoxy]phenyl)ether, 2,2'-bis-(4-aminophenyl)-hexafluoropropane (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenyl propane, 4,4'-diaminodiphenyl sulfide, 4,4'-diaminodiphenylsulfone, 3,4'diaminodiphenyl ether, 4,4'-diaminodiphenyl ether, 2,6-diaminopyridine, bis(3-aminophenyl)diethyl silane, 4,4'-diaminodiphenyl diethyl silane, benzidine, dichlorobenzidine, 3,3'-dimethoxybenzidine, 4,4'-diaminobenzophenone, N,N-bis(4-aminophenyl)-n-butylamine, N,N-bis(4-aminophenyl) methylamine, 1,5-diaminonaphthalene, 3,3'-dimethyl-4,4'-diaminobiphenyl, 4-aminophenyl-3-aminobenzoate, N,N-bis(4-aminophenyl)aniline, bis(p-beta-amino-t-butylphenyl) ether, p-bis-2-(2-methyl-4-aminopentyl)benzene, p-bis(1,1-dimethyl-5-aminopentyl)benzene, 1,3-bis(4-aminophenoxy) benzene, m-xylenediamine, p-xylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terminal poly-butyleneoxides, 4,4'-Methylenebis(2-methylcyclohexyl amine), 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, and 4,4'-methylenebisbenzeneamine, 2,2'-dimethylbenzidine, (also known as 4,4'-diamino-2,2'-dimethylbiphenyl (DMB)), bisaniline-p-xylidene, 4,4'-bis (4-aminophenoxy)biphenyl, 3,3'-bis(4 aminophenoxy)biphenyl, 4,4'-(1,4-phenylenediisopropylidene)bisaniline, and 4,4'-(1,3-phenylenediisopropylidene)bisaniline, or combinations thereof. In a specified embodiment, the diamine monomer is ODA, 2,2'-dimethylbenzidine, or both.

A non-limiting list of possible dianhydride ("diacid") monomers includes hydroquinone dianhydride, 3,3',4,4'-biphenyltetracarboxylic dianhydride (BPDA), pyromellitic dianhydride (PMDA), 3,3',4,4'-benzophenonetetracarboxylic dianhydride, 4,4'-oxydiphthalic anhydride, 3,3',4,4'-diphenylsulfonetetracarboxylic dianhydride, 4,4'-(4,4-isopropylidenediphenoxy)bis(phthalic anhydride), 2,2-bis(3,4-dicarboxyphenyl)propane dianhydride, 4,4'-(hexafluoroisopropylidene)diphthalic anhydride, bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetraearboxylic dianhydride, naphthalene-2,3,6,7-tetracarboxylic dianhydride, naphthalene-1,4,5,8-tetracarboxylie dianhydride, 4,4'-oxydiphthalic dianhydride, 3,3',4,4'-biphenylsulfone tetracarboxylic dianhydride, 3,4,9,10-perylene tetracarboxylic dianhydride, bis(3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyl)hexafluoropropane, 2,6-dichloronaphthalene-1,4,5,8-tetracarboxylic dianhydride, 2,7-dichloronapthalene-1,4,5,8-tetracarboxylic dianhydride, 2,3,6,7-tetrachloronaphthalene-1,4,5,8-tetracarboxylic dianhydride, phenanthrene, 8,9,10-tetracarboxylic dianhydride, pyrazine-2,3,5,6-tetracarboxylic dianhydride, benzene-1,2,3,4-tetracarboxylic dianhydride, and thiophene-2,3,4,5-tetracarboxylic dianhydride. In a specific embodiment, the dianhydride monomer is BPDA, PMDA, or both.

In some aspects, the molar ratio of anhydride to total diamine is from 0.4:1 to 1.6:1, 0.5:1 to 1.5:1, 0.6:1 to 1.4:1, 0.7:1 to 1.3:1, or specifically from 0.8:1 to 1.2:1. In further aspects, the molar ratio of dianhydride to multifunctional amine (e.g., triamine) is 2:1 to 140:1, 3:1 to 130:1, 4:1 to 120:1, 5:1 to 110:1, 6:1 to 100:1, 7:1 to 90:1, or specifically from 8:1 to 80:1. Mono-anhydride groups can also be used. Non-limiting examples of mono-anhydride groups include 4-amino-1,8-naphthalic anhydride, endo-bicyclo[2.2.2]oct-5-ene-2,3-dicarboxylic anhydride, citraconic anhydride, trans-1,2-cyclohexanedicarboxylic anhydride, 3,6-dichlorophthalic anhydride, 4,5-dichlorophthalic anhydride, tetrachlorophthalic anhydride 3,6-difluorophthalic anhydride, 4,5-difluorophthalic anhydride, tetrafluorophthalic anhydride, maleic anhydride, 1-cyclopentene-1,2-dicarboxylic anhydride, 2,2-dimethylglutaric anhydride 3,3-dimethylglutaric anhydride, 2,3-dimethylmaleic anhydride, 2,2-dimethyl succinic anhydride, 2,3-diphenylmaleic anhydride, phthalic anhydride, 3-methylglutaric anhydride, methylsuccinic anhydride, 3-nitrophthalic anhydride, 4-nitrophthalic anhydride, 2,3-pyrazinedicarboxylic anhydride, or 3,4-pyridinedicarboxylic anhydride. Specifically, the mono-anhydride group can be phthalic anhydride.

In another embodiment, the polymer compositions used to prepare the aerogels of the present invention include multifunctional amine monomers with at least three primary amine functionalities. The multifunctional amine may be a substituted or unsubstituted aliphatic multifunctional amine, a substituted or unsubstituted aromatic multifunctional amine, or a multifunctional amine that includes a combination of an aliphatic and two aromatic groups, or a combination of an aromatic and two aliphatic groups. A non-limiting list of possible multifunctional amines include propane-1,2,3-triamine, 2-aminomethylpropane-1,3-diamine, 3-(2-aminoethyl)pentane-1,5-diamine, bis(hexamethylene)triamine, N',N'-bis(2-aminoethyl)ethane-1,2-diamine, N',N'-bis(3-aminopropyl)propane-1,3-diamine, 4-(3-aminopropyl)heptane-1,7-diamine, N',N'-bis(6-aminohexyl) hexane-1,6-diamine, benzene-1,3,5-triamine, cyclohexane-1,3,5-triamine, melamine, N-2-dimethyl-1,2,3-propanetriamine, diethylenetriamine, 1-methyl or 1-ethyl or 1-propyl or 1-benzyl-substituted diethylenetriamine, 1,2-dibenzyldiethylenetriamine, lauryldiethylenetriamine, N-(2-hydroxypropyl)diethylenetriamine, N,N-bis(1-methylheptyl)-N-2-dimethyl-1,2,3-propanetriamine, 2,4,6-tris(4-(4-aminophenoxy)phenyl)pyridine, N,N-dibutyl-N-2-dimethyl-1,2,3-propanetriamine, 4,4'-(2-(4-aminobenzyl) propane-1,3-diyl)dianiline, 4-((bis(4-aminobenzyl)amino) methyl)aniline, 4-(2-(bis(4-aminophenethyl)amino)ethyl)

aniline, 4,4'-(3-(4-aminophenethyl)pentane-1,5-diyl)dianiline, 1,3,5-tris(4-aminophenoxy)benzene (TAPOB), 4,4',4"-methanetriyltrianiline, N,N,N',N'-Tetrakis(4-aminophenyl)-1,4-phenylenediamine, a polyoxypropylenetriamine, octa(aminophenyl)polyhedral oligomeric silsesquioxane, or combinations thereof. A specific example of a polyoxypropylenetriamine is JEFFAMINE® T-403 from Huntsman Corporation, The Woodlands, TX USA. In a specific embodiment, the aromatic multifunctional amine may be 1,3,5-tris(4-aminophenoxy)benzene or 4,4',4"-methanetriyltrianiline. In some embodiments, the multifunctional amine includes three primary amine groups and one or more secondary and/or tertiary amine groups, for example, N',N'-bis(4-aminophenyl)benzene-1,4-diamine.

Non-limiting examples of capping agents or groups include amines, maleimides, nadimides, acetylene, biphenylenes, norbornenes, cycloalkyls, and N-propargyl and specifically those derived from reagents including 5-norbornene-2,3-dicarboxylic anhydride (nadic anhydride, NA), methyl-nadic anhydride, hexachloro-nadic anhydride, cis-4-cyclohexene-1,2-dicarboxylic anhydride, 4-amino-N-propargylphthalimide, 4-ethynylphthalic anhydride, and maleic anhydride.

The characteristics or properties of the final polymer are significantly impacted by the choice of monomers which are used to produce the polymer. Factors to be considered when selecting monomers include the properties of the final polymer, such as the flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used.

In some instances, the backbone of the polymer can include substituents. The substituents (e.g., oligomers, functional groups, etc.) can be directly bonded to the backbone or linked to the backbone through a linking group (e.g., a tether or a flexible tether). In other embodiments, a compound or particles can be incorporated (e.g., blended and/or encapsulated) into the polyimide structure without being covalently bound to the polyimide structure. In some instances, the incorporation of the compound or particles can be performed during the polyamic reaction process. In some instances, particles can aggregate, thereby producing polyimides having domains with different concentrations of the non-covalently bound compounds or particles.

Specific properties of a polyimide can be influenced by incorporating certain compounds into the polyimide. The selection of monomers is one way to influence specific properties. Another way to influence properties is to add a compound or property modifying moiety to the polyimide.

B. Preparation of Polymer Aerogels with Macropores

Aerogels of the present disclosure can be made by using a multi-step process that includes 1) preparation of the polymer gel, 2) optional solvent exchange, and 3) drying of the polymeric solution to form the aerogel. These process steps are discussed in more detail below.

1. Formation of a Polymer Gel

The first stage in the synthesis of an aerogel can be the synthesis of a polymerized gel. For example, if a polyimide aerogel is desired, at least one acid monomer can be reacted with at least one diamino monomer in a reaction solvent to form a polyamic acid. As discussed above, numerous acid monomers and diamino monomers may be used to synthesize the polyamic acid. In one aspect, the polyamic acid is contacted with an imidization catalyst in the presence of a chemical dehydrating agent to form a polymerized polyimide gel via an imidization reaction. "Imidization" is defined as the conversion of a polyimide precursor into an imide. Any imidization catalyst suitable for driving the conversion of polyimide precursor to the polyimide state is suitable. Non-limiting examples of chemical imidization catalysts include pyridine, methylpyridines, quinoline, isoquinoline, 1,8-diazabicyclo[5.4.0]undec-7-ene (DBU), triethylenediamine, lutidine, N-methylmorpholine, triethylamine, tripropylamine, tributylamine, other trialkylamines, 2-methyl imidazole, 2-ethyl-4-methylimidazole, imidazole, other imidazoles, and combinations thereof. Any dehydrating agent suitable for use in formation of an imide ring from an amic acid precursor is suitable for use in the methods of the present invention. Preferred dehydrating agents comprise at least one compound selected from the group consisting of acetic anhydride, propionic anhydride, n-butyric anhydride, benzoic, anhydride, trifluoroacetic anhydride, phosphorus trichloride, and dicyclohexylcarbodiimide.

In one aspect of the current invention, one or more diamino monomers and one or more multifunctional amine monomers are premixed in one or more solvents and then treated with one or more dianhydrides (e.g., di-acid monomers) that are added in sequentially smaller amounts at pre-defined time increments while monitoring the viscosity. The desired viscosity of the polymerized solution can range from 50 to 20,000 cP or specifically 500 to 5,000 cP. By performing the reaction using incremental addition of dianhydride while monitoring viscosity, a non-crosslinked aerogel can be prepared. For instance, a triamine monomer (23 equiv.) can be added to the solvent to give a 0.0081 molar solution. To the solution a first diamine monomer (280 equiv.) can be added, followed by second diamine monomer (280 equiv.). Next a dianhydride (552 total equiv.) can be added in sequentially smaller amounts at pre-defined time increments while monitoring the viscosity. The dianhydride can be added until the viscosity reaches 1,000 to 1,500 cP. For example, a first portion of dianhydride can be added, the reaction can be stirred (e.g., for 20 minutes), a second portion of dianhydride can be added, and a sample of the reaction mixture was then analyzed for viscosity. After stirring for additional time (e.g., for 20 minutes), a third portion of dianhydride can be added, and a sample can be taken for analysis of viscosity. After further stirring for a desired period of time (e.g., 10 hours to 12 hours), a mono-anhydride (96 equiv.) can be added. After having reached the target viscosity, the reaction mixture can be stirred for a desired period of time (e.g., 10 hours to 12 hours) or the reaction is deemed completed.

The reaction temperature for the gel formation can be determined by routine experimentation depending on the starting materials. In a preferred embodiment, the temperature range can be greater than, equal to, or between any two of 15° C., 20° C., 30° C., 35° C., 40° C., and 45° C. After a desired amount of time (e.g., about 2 hours), the product can be isolated (e.g., filtered), after which a nitrogen containing hydrocarbon (828 equiv.) and dehydration agent (1214 equiv.) can be added. The addition of the nitrogen containing hydrocarbon and/or dehydration agent can occur at any temperature. In some embodiments, the nitrogen containing hydrocarbon and/or dehydration agent is added to the solution at 20° C. to 28° C. (e.g., room temperature) stirred for a desired amount of time at room temperature. In some instances, after addition of nitrogen containing hydrocarbon and/or dehydration agent, the solution temperature is raised up to 150° C.

The reaction solvent can include dimethylsulfoxide (DMSO), diethylsulfoxide, N,N-dimethylformamide (DMF), N,N-diethylformamide, N,N-dimethylacetamide (DMAc), N,N-diethylacetamide, N-methyl-2-pyrrolidone (NMP), 1-methyl-2-pyrrolidinone, N-cyclohexyl-2-pyrrolidone, 1,13-dimethyl-2-imidazolidinone, diethyleneglycoldimethoxyether, o-dichlorobenzene, phenols, cresols, xylenol, catechol, butyrolactones, hexamethylphosphoramide, and mixtures thereof. The reaction solvent and other reactants can be selected based on the compatibility with the materials and methods applied i.e. if the polymerized polyamic amide gel is to be cast onto a support film, injected into a moldable part, or poured into a shape for further processing into a workpiece. In a specific embodiment, the reaction solvent is DMSO.

While keeping the above in mind, the introduction of macropores into the aerogel polymeric matrix, as well as the amount of such macropores present, can be performed in the manner described above in the Summary of the Invention Section as well as throughout this specification. In one non-limiting manner, the formation of macropores versus smaller mesopores and micropores can be primarily controlled by controlling the polymer/solvent dynamics during gel formation. By doing so, the pore structure can be controlled, and the quantity and volume of macroporous, mesoporous, microporous cells can be controlled. For example, a curing additive that reduces the solubility of the polymers being formed during polymerization step (b), such as 1,4-diazabicyclo[2.2.2]octane, can produce a polymer gel containing a higher number of macropores as compared to another curing additive that improves the resultant polymer solubility, such as triethylamine. In another specific non-limiting example when forming a polyimide aerogel having macropores, increasing the ratio of rigid amines incorporated into the polymer backbone such as p-phenylenediamine (p-PDA) as compared to more flexible diamines such as -ODA, the formation of macropores as compared to smaller mesopores and micropores can be controlled.

The polymer solution may optionally be cast onto a casting sheet covered by a support film for a period of time. Casting can include spin casting, gravure coating, three roll coating, knife over roll coating, slot die extrusion, dip coating, Meyer rod coating, or other techniques. In one embodiment, the casting sheet is a polyethylene terephthalate (PET) casting sheet. After a passage of time, the polymerized reinforced gel is removed from the casting sheet and prepared for the solvent exchange process. In some embodiments, the cast film can be heated in stages to elevated temperatures to remove solvent and convert the amic acid functional groups in the polyamic acid to imides with a cyclodehydration reaction, also called imidization. In some instances, polyamic acids may be converted in solution to polyimides with the addition of the chemical dehydrating agent, catalyst, and/or heat.

In some embodiments, the polyimide polymers can be produced by preparing a polyamic acid polymer in the reaction vessel. The polyamic acid is then formed into a sheet or a film and subsequently processed with catalysts or heat and catalysts to convert the polyamic acid to a polyimide.

2. Optional Solvent Exchange

After the polymer gel is synthesized, it may be desirable in certain instances to conduct a solvent exchange wherein the reaction solvent is exchanged for a more desirable second solvent. Accordingly, in one embodiment, a solvent exchange can be conducted wherein the polymerized gel is placed inside of a pressure vessel and submerged in a mixture comprising the reaction solvent and the second solvent. Then, a high pressure atmosphere is created inside of the pressure vessel thereby forcing the second solvent into the polymerized gel and displacing a portion of the reaction solvent. Alternatively, the solvent exchange step may be conducted without the use of a high pressure environment. It may be necessary to conduct a plurality of rounds of solvent exchange. In some embodiments, solvent exchange is not necessary.

The time necessary to conduct the solvent exchange will vary depending upon the type of polymer undergoing the exchange as well as the reaction solvent and second solvent being used. In one embodiment, each solvent exchange can range from 1 to 168 hours or any period time there between including 2, 3, 4, 5, 6, 7, 8, 9, 10, 11, 12, 13, 14, 15, 16, 17, 18, 19, 20, 21, 22, or 23, 24, 25, 50, 75, 100, 125, 150, 155, 160, 165, 166, 167, or 168 hours. In another embodiment, each solvent exchange can take approximately 1 to 60 minutes, or about 30 minutes. Exemplary second solvents include methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, cyclohexanone, acetone, acetyl acetone, 1,4-dioxane, diethyl ether, dichloromethane, trichloroethylene, chloroform, carbon tetrachloride, water, and mixtures thereof. In certain non-limiting embodiments, the second solvent can have a suitable freezing point for performing supercritical or subcritical drying steps. For example tert-butyl alcohol has a freezing point of 25.5° C. and water has a freezing point of 0° C. under one atmosphere of pressure. Alternatively, and as discussed below, however, the drying can be performed without the use of supercritical or subcritical drying steps, such as by evaporative drying techniques.

The temperature and pressure used in the solvent exchange process may be varied. The duration of the solvent exchange process can be adjusted by performing the solvent exchange at a varying temperatures or atmospheric pressures, or both, provided that the pressure and temperature inside the pressure vessel does not cause either the first solvent or the second solvent to leave the liquid phase and become gaseous phase, vapor phase, solid phase, or supercritical fluid. Generally, higher pressures and/or temperatures decrease the amount of time required to perform the solvent exchange, and lower temperatures and/or pressures increase the amount of time required to perform the solvent exchange.

3. Cooling and Drying

In one embodiment after solvent exchange, the polymerized gel can be exposed to supercritical drying. In this instance the solvent in the gel can be removed by supercritical $CO_2$ extraction.

In another embodiment after solvent exchange, the polymerized reinforced gel can be exposed to subcritical drying. In this instance, the gel can be cooled below the freezing point of the second solvent and subjected to a freeze drying or lyophilization process to produce the aerogel. For example, if the second solvent is water, then the polymerized gel is cooled to below 0° C. After cooling, the polymerized gel can be subjected to a vacuum for a period of time to allow sublimation of the second solvent In still another embodiment, after solvent exchange, the polymerized gel can be exposed to subcritical drying with optional heating after the majority of the second solvent has been removed through sublimation. In this instance the partially dried gel material is heated to a temperature near or above the boiling point of the second solvent for a period of time. The period of time can range from a few hours to several days, although a typical period of time is approximately 4 hours. During the sublimation process, a portion of the second solvent present in the polymerized gel has been removed, leaving a gel that can have macropores, mesopores, or micropores, or any combination thereof or all of such pore sizes. After the sublimation process is complete, or nearly complete, the aerogel has been formed.

In yet another embodiment after solvent exchange, the polymerized gel can be dried under ambient conditions, for example, by removing the solvent under a stream of gas (e.g., air, anhydrous gas, inert gas (e.g., nitrogen ($N_2$) gas), etc.). Still further, passive drying techniques can be used such as simply exposing the gel to ambient conditions without the use of a gaseous stream.

4. Incorporation of a Support Material into the Matrix of the Polymeric Aerogel

In an optional embodiment of the present invention, a support material can be incorporated into the polymeric matrix to create a reinforced polymeric aerogel. Notably, during manufacture of a non-reinforced polymer aerogel a reinforcing support film can be used as a carrier to support the gelled film during processing. During rewinding, the gelled film can be irreversibly pressed into the carrier film. Pressing the gelled film into the carrier film can provide substantial durability improvement. In another instance, during the above-mentioned solvent casting step, the polymer solution can be cast into a reinforcement or support material.

The substrate selection and direct casting can allow optimization of (e.g., minimization) of the thickness of the resulting reinforced aerogel material. This process can also be extended to the production of fiber reinforced polymer aerogels—internally reinforced polyimide aerogels are provided as an example. The process can include: (a) forming a polyamic acid solution from a mixture of dianhydride and diamine monomers in a polar solvent such as DMSO, DMAc, NMP, or DMF; (b) contacting the polyamic acid solution with chemical curing agents listed above and a chemical dehydrating agent to initiate chemical imidization; (c) casting the polyamic acid solution onto a fibrous support prior to gelation and allow it to permeate it; (d) allowing the catalyzed polyamic acid solution to gel around, and into, the fibrous support during chemical imidization; (e) optionally performing a solvent exchange, which can facilitate drying; and (f) removal of the transient liquid phase contained within the gel with supercritical, subcritical, or ambient drying to give an internally reinforced aerogel. The polyimide aerogels can be produced from aromatic dianhydride and diamine monomers, such as aromatic diamines or a mixture of at least one aromatic diamine monomer and at least one aliphatic diamine monomer. The resulting polyimide aerogel can be optimized to possess low density, narrow pore size distribution and good mechanical strength. The polyimide aerogel can also be optimized to include mesopores, micropores, or macropores, or any combination thereof or all such pore sizes.

The preparation of polyimide wet gels can be a two-step procedure: (a) formation of the polyamic acid solution from a mixture of dianhydride and diamine in a polar solvent such as DMAc, NMP, DMF, or DMSO; and (b) catalyzed cyclization with chemical catalyzing agents to form a polyimide. In some embodiments, at least 30 minutes mixing at room temperature can be performed to allow for formation of the polyimide polymer and yielding of stable, robust wet gels. Gelation conditions depend on several factors, including the prepared density of the solution and the temperature of the heating oven. Higher concentration solutions can gel faster than lower density solutions. Once the system has reached the gelled state, the gels are optionally rinsed repeatedly with acetone, ethanol, or the like. Rinsing occurs at least three times prior to drying, and serves to remove residual solvent and unreacted monomers. $CO_2$ can then be used in techniques known to those in the art for wet solvent extraction to create the aerogel structure. Other techniques for preparing and optimizing polyimide aerogels can be used and are known in the art.

The reinforced macroporously structured aerogels of the present invention can be any width or length and can be in the form of defined geometry (e.g., a square or circular patch or any other stock shape), or in the form of a sheet or roll. In some instances, the internally reinforced aerogels can have a width up to 6 meters and a length of up to 10 meters, or from 0.01 to 6 meters, 0.5 to 5 meters, 1 to 4 meters, or any range in between, and a length of 1 to 10,000 meters, 5 to 1,000 meters, 10 to 100 meters or any range there between. The width of the composite can be 0.01, 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0 meters, including any value there between. The length of the internally reinforced aerogels can be 0.1, 1, 10, 100, 500, 1000, 1500, 2000, 2500, 3000, 3500, 4000, 4500, 5000, 5500, 6000, 6500, 7000, 7500, 8000, 8500, 9000, 9500, 10000 meters and include any value there between. In certain aspect the length of the internally reinforced aerogel can be 1000 meters, and 1.5 meters, respectively, in width. In a further embodiment the internally reinforced aerogel is 100 feet (30.5 meters) in length and 40 inches (1.0 meter) wide.

In certain embodiments the internally reinforced aerogel includes a non-woven support at least partially or fully embedded or incorporated in a polymeric aerogel.

The support can be comprised of a plurality of fibers. The fibers can be unidirectionally or omnidirectionally oriented. The support can include, by volume, at least 0.1 to 50% of the internally reinforced aerogel. The support can be in the form of a plurality of fibers, a film or layer of fibers, fiber containing films or layers, or a support film or layer comprising two or more fiber layers pressed together to form the support. The support can include cellulose fibers, glass fibers, carbon fibers, aramid fibers, thermoplastic fibers (e.g., polyethylene fibers, polyester, nylon, etc.), thermoset fibers (e.g., rayon, polyurethane, and the like), ceramic fibers, basalt fibers, rock wool, or steel fibers, or mixtures thereof. The fibers can have an average filament cross sectional area of 7 $\mu m^2$ to 800 $\mu m^2$, which equates to an average diameter of 3 to 30 microns for circular fibers. Bundles of various kinds of fibers can be used depending on the use intended for the internally reinforced aerogel. For example, the bundles may be of carbon fibers or ceramic fibers, or of fibers that are precursors of carbon or ceramic, glass fibers, aramid fibers, or a mixture of different kinds of fiber. Bundles can include any number of fibers. For example, a bundle can include 400, 750, 800, 1375, 1000, 1500, 3000, 6000, 12000, 24000, 50000, or 60000 filaments. The fibers can have a filament diameter of 5 to 24 microns, 10 to 20 microns, or 12 to 15 microns or any range there between, or 5, 6, 7, 8, 9, 10, 11, 12, 13, 14, 15, 16, 17, 18, 19, 20, 21, 22, 23, 24 microns or any value there between. The fibers in a bundle of fibers can have an average filament cross sectional area of 7 $\mu m^2$ to 800 $\mu m^2$, which equates to an average diameter of 3 to 30 microns for circular fibers. Cellulose and paper supports can be obtained from Hirose Paper Mfg Co (Kochi, Japan) or Hirose Paper North America (Macon, Georgia, USA).

Thermoplastic and thermoset fibers can include thermoplastic and/or thermoset polymers. Non-limiting examples of thermoplastic polymers include polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, polyesters or derivatives thereof, polyamides or derivatives thereof (e.g., nylon), or blends thereof.

Non-limiting examples of thermoset polymers include unsaturated polyester resins, polyurethanes, polyoxybenzylmethylenglycolanhydride (e.g., Bakelite), urea-formaldehyde, diallyl-phthalate, epoxy resin, epoxy vinylesters, polyimides, cyanate esters of polycyanurates, dicyclopentadiene, phenolics, benzoxazines, co-polymers thereof, or blends thereof.

In other aspects, the internally reinforced aerogel can includes two or more layers of a support. In certain instances, a support can include two unidirectional supports in contact with each other and arranged such that the unidirectional fibers are oriented in different directions to each other. In other instances, the support can comprises two or more layers of a support having omnidirectional fibers.

The support can be positioned at least partially or fully inside a polymeric aerogel, forming an internal support and an external aerogel. As used herein any support that is at least partially permeated with aerogel material can be partially internalized. The width and length of the aerogel can be substantially similar to the width and length of the internal or partially internalized support.

Figure 2:
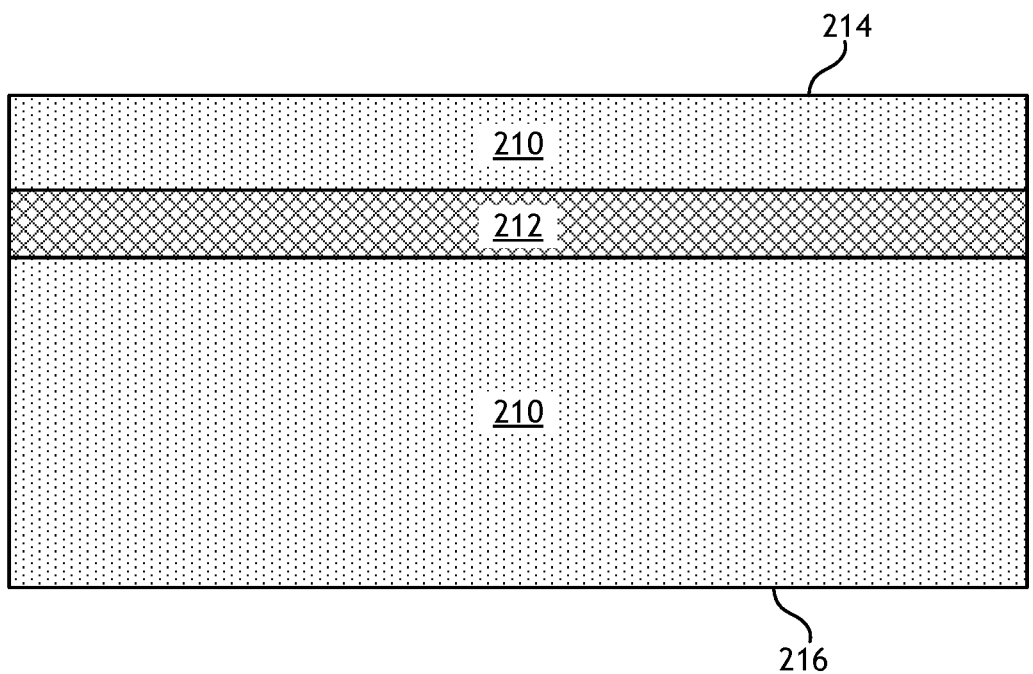
FIG. 2 is an illustration of embodiment of an internally reinforced aerogel having the support positioned at internal offset position in the aerogel.
Figure 3:
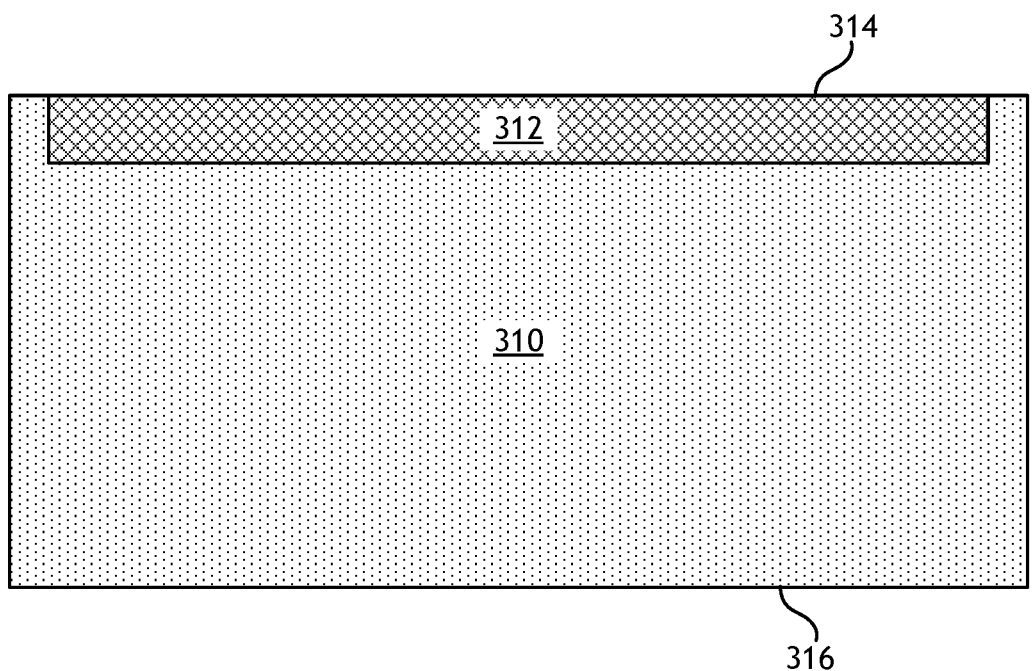
FIG. 3 is an illustration of an embodiment of an internally reinforced aerogel having the support positioned at the edge of the aerogel.
Figure 4:
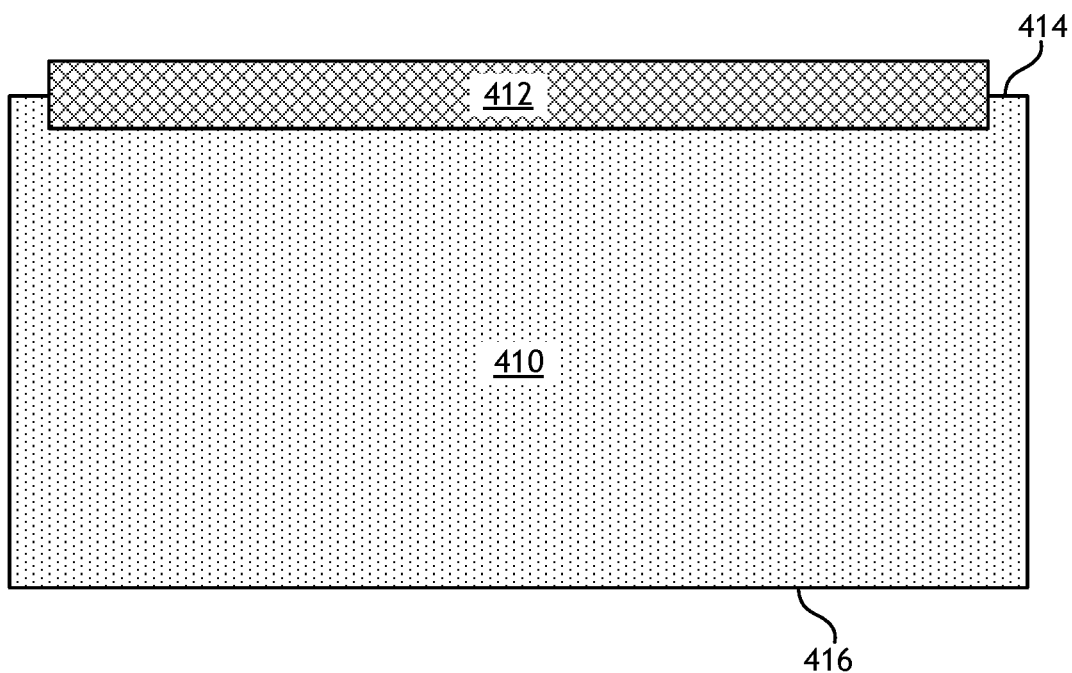
FIG. 4 is an illustration of an embodiment of an internally reinforced aerogel having the support positioned partially penetrating the aerogel.

FIG. 1 illustrates an internally reinforced aerogel having internal support 112 positioned at about the midline of aerogel 110. Support 112 is approximately equidistant from top edge 114 and bottom edge 116. FIG. 2 illustrates and embodiment where internal support 212 is in an offset position within aerogel 210. Support 212 being closer to one edge (in the illustrated case top edge 214) than the other edge (bottom edge 216). In other embodiments support 212 can be positioned closer to the bottom edge. FIG. 3 illustrates an embodiment where the outer edge of support 312 is positioned along the top edge 314 of aerogel 310. In other embodiments support 312 can be positioned along bottom edge 316. FIG. 4 illustrates another embodiment where support 412 is partially incorporated into aerogel 410. In this embodiments a portion of the support is above or outside top edge 414. In other embodiments the position of the support can be at bottom edge 416.

Figure 5:
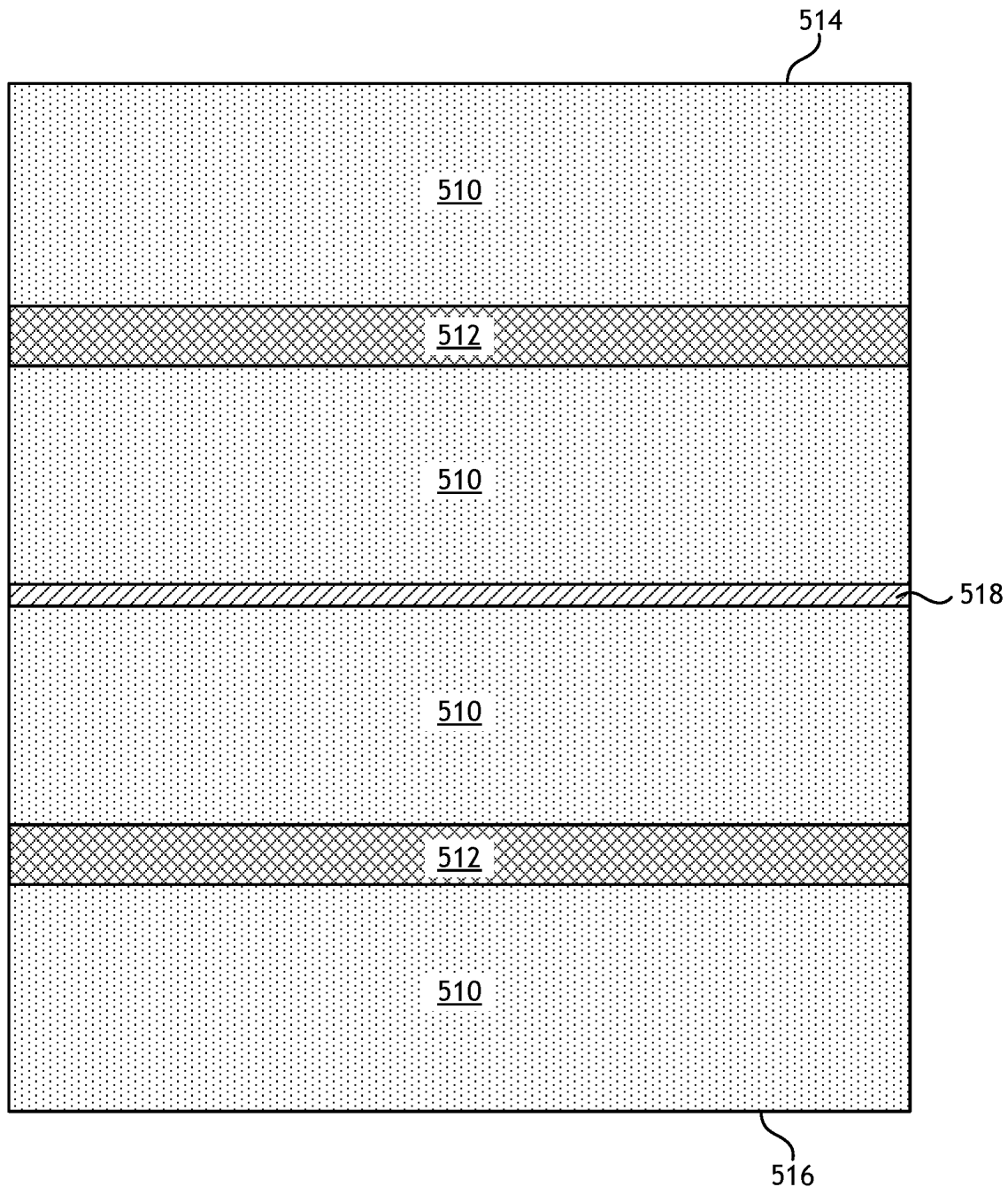
FIG. 5 is an illustration of an embodiment of an aerogel laminate comprising a plurality or reinforced aerogels formed into a multiplayer laminate structure.

In certain embodiments, a reinforced aerogel laminate can be constructed having 2, 3, 4, 5 or more reinforced aerogel layers (See FIG. 5). FIG. 5 shows a two-layer laminate. In this example each layer is configured as shown in FIG. 1; however, any number of reinforced aerogel configurations can be used and in any combination. Each of the reinforced aerogel layer depicted in FIG. 5 include aerogel 510 and support 512. The layers can be adhered to each through an aerogel/aerogel interface or by an adhesive 518. The laminate having top edge 514 and a bottom edge 516.

The cross-sectional thickness of the internally reinforced aerogel measured from top most edge to bottom most edge can be any value. In some embodiments the cross-sectional thickness is between 0.02 to 0.5 mm, including all values and ranges there between. The support can be positioned in the aerogel so that about 0, 0.001, 0.01, 0.025, 0.05, 0.075, 0.1, 0.125, 0.15, 0.175, 0.2, 0.225, 0.25, 0.275, 0.3, 0.325, 0.35, 0.375, 0.4 mm of the aerogel is above the support. In certain instances, the support can be approximately within about 0.5 mils (0.013 mm) of the aerogel midline. In a further aspect about 0.1 to 0.5 mil (0.0025 to 0.013 mm) of support extends beyond one of the aerogel edges with a portion of the support being embedded or incorporated in the aerogel.

C. Articles of Manufacture Incorporating the Macroporous Aerogels

In some aspects, an article of manufacture is presented that includes any one of the reinforced or unreinforced macroporous aerogels of the present invention. In some embodiments, the article of manufacture is a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration applications, oil-based filtration applications, and solvent-based filtration applications.

1. Fluid Filtration Applications

In some embodiments, the reinforced or unreinforced macroporous aerogels of the present invention can be used in fluid filtration systems and apparatus. In such applications, the aerogel can be permeable to the fluid being filtered. A feed fluid can be contacted with the aerogel such that all or, substantially all, of the impurities and/or desired substances are removed from the feed fluid to produce a filtrate essentially devoid of the impurities and/or desired substances. The filtrate, impurities, and/or desired substances can be collected, stored, transported, recycled, or further processed. The aerogel can be further processed to release the impurities and/or desired substances from the aerogel.

The aerogels of the present invention can be used in or with filtration apparatuses known in the art. Non-limiting examples of filtration apparatuses and applications include gas filters such as, but not limited to, building air filters, automotive cabin air filters, combustion engine air filters, aircraft air filters, satellite air filters, face mask filters, diesel particulate filters, in-line gas filters, cylinder gas filters, soot filters, pressure swing absorption apparatus, etc. Additional non-limiting examples of filtration apparatuses and applications include solvent filtration systems, column filtration, chromatography filtration, vacuum flask filtration, microfiltration, ultrafiltration, reverse osmosis filtration, nanofiltration, centrifugal filtration, gravity filtration, cross flow filtration, dialysis, hemofiltration, hydraulic oil filtration, automotive oil filtration, etc. Further, non-limiting examples of the purpose of filtration includes sterilization, separation, purification, isolation, etc.

A fluid for filtration ("feed") and a filtrate can be any fluid. The fluid can be a liquid, gas, supercritical fluid, or mixture thereof. In some instances, the fluid can be aqueous, organic, non-organic, biological in origin, or a mixture thereof. In some instances, the fluid can contain solids and/or other fluids. As non-limiting examples, the fluid can be or can be partially water, blood, an oil, a solvent, air, or mixtures thereof. Water can include water, any form of steam and supercritical water.

In some instances, the fluid can contain impurities. Non-limiting examples of impurities include solids, liquids, gases, supercritical fluids, objects, compounds, and/or chemicals, etc. What is defined as an impurity may be different for the same feed fluid depending on the filtrate desired. In some embodiments, one or more aerogels can be used to remove impurities. Non-limiting examples of impurities in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, nonionic surfactants, defoamants, chelating agents, microorganisms, particulate matter, etc. Non-limiting examples of impurities in blood can include red blood cells, white blood cells, antibodies, microorganisms, water, urea, potassium, phosphorus, gases, particulate matter, etc. Non-limiting examples of impurities in oil can include water, particulate matter, heavy and/or light weight hydrocarbons, metals, sulfur, defoamants, etc. Non-limiting examples of impurities in solvents can include water, particulate matter, metals, gases, etc. Non-limiting impurities in air can include water, particulate matter, microorganisms, liquids, carbon monoxide, sulfur dioxide, etc.

In some instances, the feed fluid can contain desired substances. Non-limiting examples of desired substances include solids, liquids, gases, supercritical fluids, objects, compounds, and/or chemicals, etc. In some embodiments, one or more aerogels can be used to concentrate or capture a desired substance, or remove a fluid from a desired substance. Non-limiting examples of desired substances in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, nonionic surfactants, chelating agents, defoamants, etc. Non-limiting examples of desired substances in blood can include red blood cells, white blood cells, antibodies, lipids, proteins, etc. Non-limiting examples of desired substances in oil can include hydrocarbons of a range of molecular weights, gases, metals, etc. Non-limiting examples of desired substances in solvents can include particulate matter, fluids, gases, proteins, lipids, etc. Non-limiting examples of desired substances in air can include water, fluids, gases, particulate matter, etc.

Figure 8:
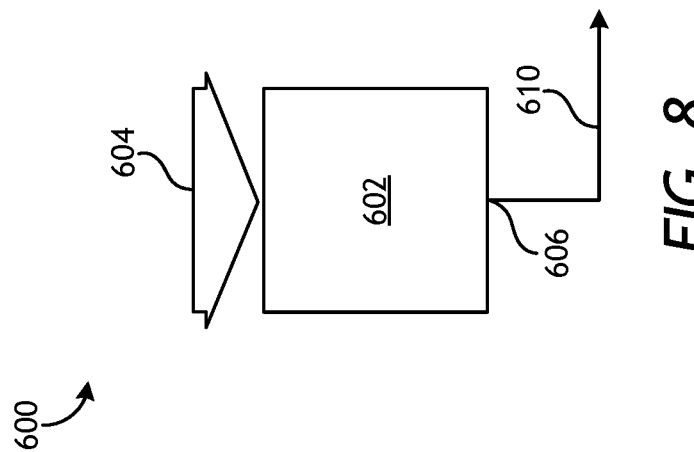
FIG. 8 is a schematic of system of an embodiment for filtering a fluid using an aerogel of the present invention, the system having a separation zone and an outlet.
Figure 7:
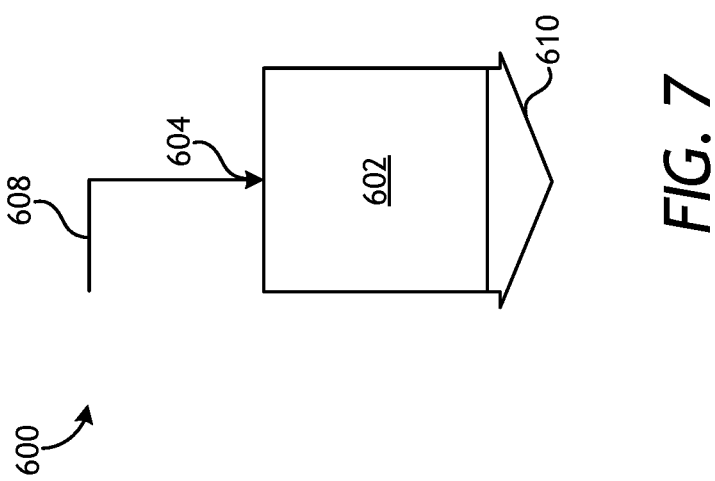
FIG. 7 is a schematic of system of an embodiment for filtering a fluid using an aerogel of the present invention, the system having a separation zone and an inlet.
Figure 6:
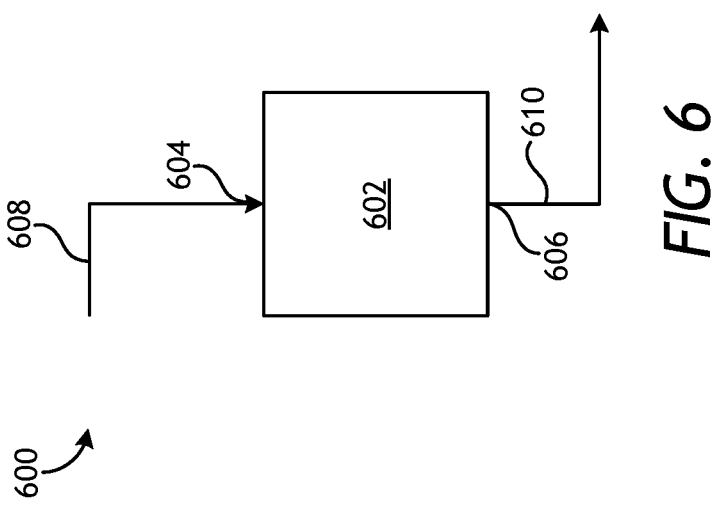
FIG. 6 is a schematic of system of an embodiment for filtering a fluid using an aerogel of the present invention, the system having a separation zone, an inlet, and an outlet.

FIGS. 6 through 8 are non-limiting schematics of a system 600 used to carry out a filtration of a fluid using an aerogel of the present invention. System 600 can include separation zone 602. The materials, size, and shape of separation zone 602 can be determined using standard engineering practice to achieve the desired flow rates and contact time. Separation zone 602 is capable of holding or may be made of one or more aerogels and includes feed fluid inlet 604 (inlet) and/or filtrate outlet 606 (outlet). In some instances, the separation zone is made entirely of one or more aerogels or one or more aerogels in or around a supporting structure. Feed fluid 608 can be introduced to separation zone 602 through inlet 104 (see, FIGS. 6 and 7) or through direct contact with separation zone 602 (FIG. 8). In some embodiments, feed fluid 608 can be received under greater or reduced pressure than ambient pressure. Introduction of feed fluid 608 into separation zone 602 can be at a rate sufficient to allow optimum contact of the feed fluid with the one or more aerogels. Contact of feed fluid 608 with the aerogel can allow the feed fluid to be filtered by the aerogel, which results in filtrate 610. Filtrate 610 can have less impurity and/or desired substance when compared with feed fluid 608. In certain aspects, filtrate 610 can be essentially free of the impurity and/or the desired substance. Filtrate 610 can exit separation zone 602 via outlet 606 (See, FIGS. 6 and 8) or through directly exiting separation zone 602 (See, FIG. 7). In some instances, the filtrate can be recycled back to a separation zone, collected, stored in a storage unit, etc. In some instances, one or more aerogels can be removed and/or replaced from the separation zone. In some instances, filtrate 610 can be collected and/or removed from separation zone 602 without filtrate 610 flowing through outlet 606. In some instances, the impurities and/or desired substance can be removed from separation zone 602. As one non-limiting example, the impurities and/or desired substances can be removed from the separation zone by flowing a fluid through the separation zone in the reverse direction from the flow of the feed fluid through the separation zone.

The filtration conditions in the separation zone 602 can be varied to achieve a desired result (e.g., removal of substantially all of the impurities and/or desired substance from the feed fluid). The filtration conditions include temperature, pressure, fluid feed flow, filtrate flow, or any combination thereof. Filtration conditions are controlled, in some instances, to produce streams with specific properties. Separation zone 602 can also include valves, thermocouples, controllers (automated or manual controllers), computers or any other equipment deemed necessary to control or operate the separation zone. The flow of feed fluid 604 can be adjusted and controlled to maintain optimum contact of the feed fluid with the one or more aerogel. In some embodiments, computer simulations can be used to determine flow rates for separation zones of various dimensions and various aerogels.

The compatibility of an aerogel with a fluid and/or filtration application can be determined by methods known in the art. Some properties of an aerogel that may be determined to assess the compatibility of the aerogel may include, but is not limited to: the temperature and/or pressures that the aerogel melts, dissolves, oxidizes, reacts, degrades, or breaks; the solubility of the aerogel in the material that will contact the aerogel; the flow rate of the fluid through the aerogel; the retention rate of the impurity and/or desired product form the feed fluid; etc.

2. Radiofrequency (RF) Applications

Due to their low density, mechanical robustness, light weight, and low dielectric properties, the aerogels of the present invention can be used in radiofrequency (RF) applications. The use of macroporous aerogels in RF applications enables the design of thinner substrates, lighter weight substrates and smaller substrates. Non-limiting examples of radiofrequency applications include a substrate for a RF antenna, a sunshield for a RF antenna, a radome, or the like. Antennas can include flexible and/or rigid antennas, broadband planar circuited antennas (e.g., a patch antennas, an e-shaped wideband patch antenna, an elliptically polarized circular patch antenna, a monopole antenna, a planar antenna with circular slots, a bow-tie antenna, an inverted-F antenna and the like). In the antenna design, the circuitry can be attached to a substrate that includes the aerogel and/or a combination of the aerogel and other components such as other polymeric materials including adhesives or polymer films, organic and inorganic fibers (e.g., polyester, polyamide, polyimide, carbon, glass fibers, and the like), other organic and inorganic materials including silica aerogels, polymer powder, glass reinforcement, etc. The use of aerogels in antennas enables the design substrates with higher throughput. In addition, the aerogels can have coefficient of linear thermal expansion (CTE) similar to aluminum and copper (e.g., CTE of 23/K and 17 ppm/K), and is tunable through choice of monomer to match CTE of other desirable materials. In some embodiments, the aerogel can be used in sunshields and/or sunscreens used to protect RF antennas from thermal cycles due to their temperature insensitivity and RF transparency. In certain embodiments, the aerogel can be used as a material in a radome application. A radome is a structural, weatherproof enclosure that protects a microwave (e.g., radar) antenna. Aerogels can minimize signal loss due to their low dielectric constant and also provide structural integrity due to their stiffness.

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Table 1 lists the acronyms for the compounds used in Examples 1-7.

TABLE 1

| Acronym | Name |
|---|---|
| BPDA | 3,3',4,4'-biphenyltetracarboxylic dianhydride |
| DMB | 4,4'-Diamino-2,2'-dimethylbiphenyl |
| DMSO | Dimethylsulfoxide |
| PA | Phthalic anhydride |
| PMDA | Pyromellitic dianhydride |
| ODA | 4,4'-Oxydianiline |
| TAPOB | 1,3,5-Tris(4-aminophenoxy) benzene |

Structures of the starting materials are shown below.

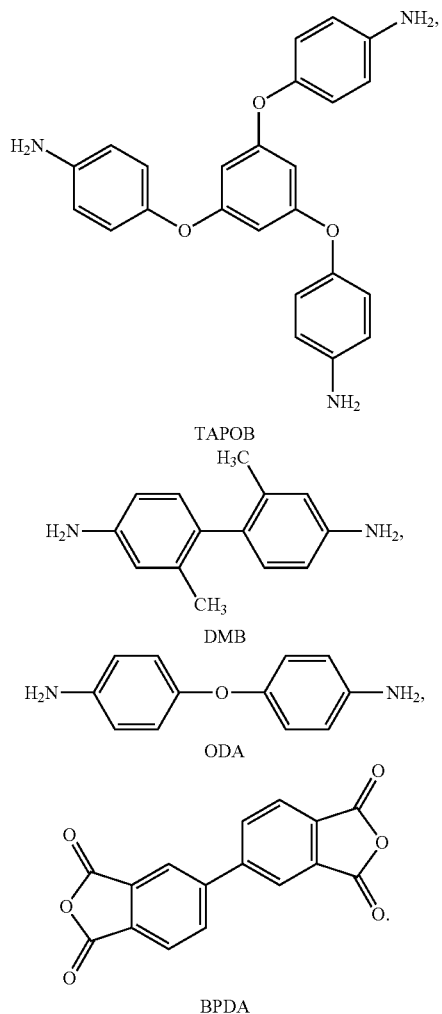

Example 1

Preparation of a Highly Branched BPDA/DMB-ODA Polyimide

A reaction vessel with a mechanical stirrer and a water jacket was used. The flow of the water through the reaction vessel jacket was adjusted to maintain temperature in the range of 18-35° C. The reaction vessel was charged with DMSO (108.2 lbs. 49.1 kg), and the mechanical stirrer speed was adjusted to 120-135 rpm. TAPOB (65.13 g) was added to the solvent. To the solution was added DMB (1081.6 g), followed by ODA (1020.2 g). A first portion of BPDA (1438.4 g) was then added. After stirring for 20 minutes, a sample of the reaction mixture was analyzed for viscosity using a Brookfield DV1 viscometer (Brookfield, AMETEK, U.S.A.). A second portion of BPDA (1407.8 g) was added, and the reaction mixture was stirred for 20 additional minutes. A third portion of BPDA (138.62 g) was added, and the reaction mixture was stirred for 20 minutes. A sample of the reaction mixture was analyzed for viscosity. After stirring for 8 hours, PA (86.03 g) was added. The resulting reaction mixture was stirred until no more solids were visible. After 2 hours, the product was removed from the reaction vessel, filtered, and weighed.

Example 2

Figure 9:
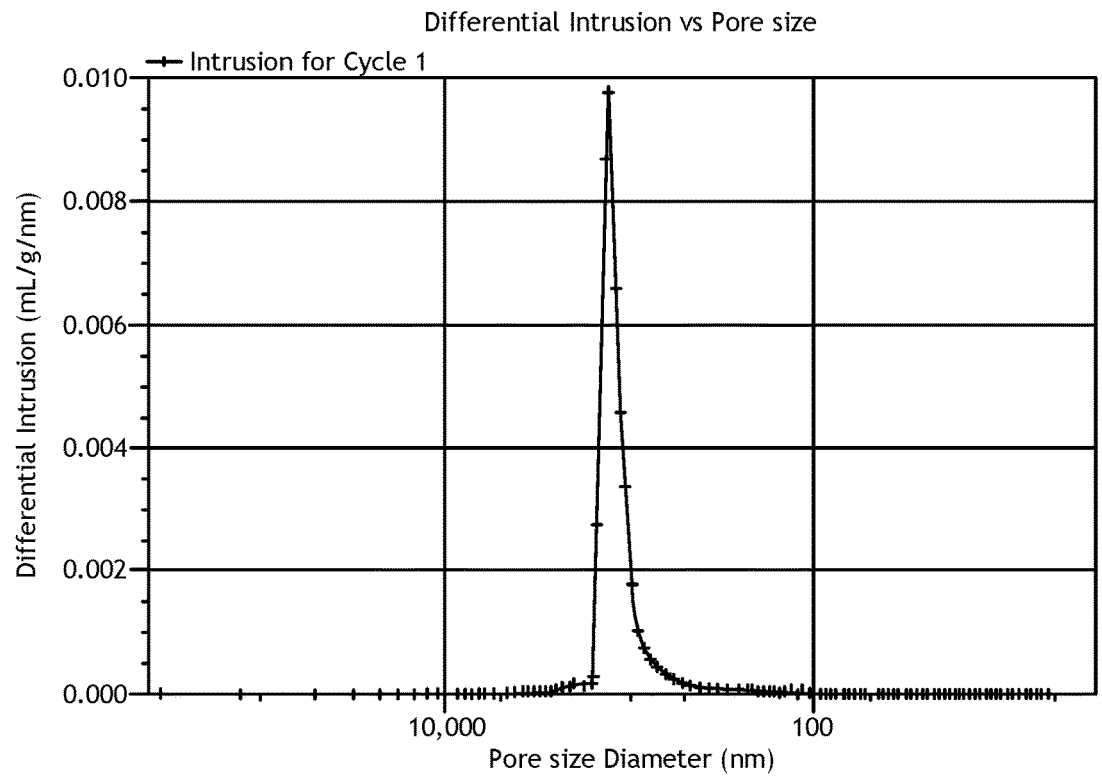
FIG. 9 is a distribution of pore size diameter for a first non-limiting aerogel of the present invention.

Preparation of a Highly Branched Polyimide Aerogel Monolith by Freeze Drying The resin (about 10,000 grams) prepared in Example 1 was mixed with triethylamine (about 219 grams) and acetic anhydride (about 561 grams) for five minutes. After mixing, the resultant solution was poured into a square 15"×15" mold and left for 48 hours. The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times The part was subsequently flash frozen and subjected to subcritical drying for 96 hours in at 5° C., followed by drying in vacuum at 50° C. for 48 hours. The final recovered aerogel part had open-cell structure as observed by scanning electron microscopy (SEM) performed on a Phenom Pro Scanning Electron Microscope (Phenom-World, the Netherlands), exhibited a density of 0.22 g/cm$^3$ and porosity of 88.5% as measured according to ASTM D4404-10 with a Micromeritics® AutoPore V 9605 Automatic Mercury Penetrometer (Micromeritics® Instrument Corporation, U.S.A.), a compression modulus of 2.2 MPa as determined by American Standard Testing Method (ASTM) D395-16, and a compression strength at 25% strain of 3.5 MPa as determined by ASTM D395-16. The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is provided in FIG. 9. From the data it was determined that 100% of the pores were macropores and that the average pore diameter was about 1200 nm, thus confirming that a macroporously shaped aerogel was produced.

Example 3

Preparation of a Highly Branched Polyimide Aerogel Monolith by Thermal Drying The resin (about 10,000 grams) prepared in Example 1 was mixed with triethylamine (about 219 grams) and acetic anhydride (about 561 grams) for five minutes at a temperature of 10-35° C. After mixing, the resultant solution was poured into a square 15"×15" mold and left for 48 hours. The gelled shape was removed from the mold and placed into an acetone bath. After immersion for 24 hours, the acetone bath was exchanged with fresh acetone. The soak and exchange process was repeated five times. After the final exchange, the part was dried with an ambient (about 20 to 30° C.) drying process to evaporate a majority of the acetone over 48 hours followed by thermal drying at 50° C. for 4 hours, 100° C. for 2 hours, 150° C. for 1 hour, and then 200° C. for 30 minutes. The final recovered aerogel had similar properties as observed in Example 2.

Example 4

Preparation of a Highly Branched Polyimide

TAPOB (about 2.86 g) was added to the reaction vessel charged with about 2,523.54 g DMSO as described in Example 1 at a temperature of 18-35° C. To the solution was added a first portion of DMB (about 46.75 g), followed by a first portion of ODA (about 44.09 g). After stirring for about 20 minutes, a first portion of BPDA (about 119.46 g) was added. After stirring for about 20 minutes, TAPOB (about 2.86 g), DMB (about 46.75 g), and ODA (about 44.09 g) were added. After stirring for about 20 minutes, BPDA (about 119.46 g) was added. After stirring for about 20 minutes, TAPOB (about 2.86 g), DMB (about 46.75 g), and ODA (about 44.09 g) were added. After stirring for about 20 minutes, BPDA (about 119.46 g) was added. After stirring for about 8 hours, PA (about 50.12 g) was added. The resulting reaction mixture was stirred until no more solids were visible. After about 2 hours, the product was removed from the reaction vessel, filtered, and weighed.

Example 5

Figure 10:
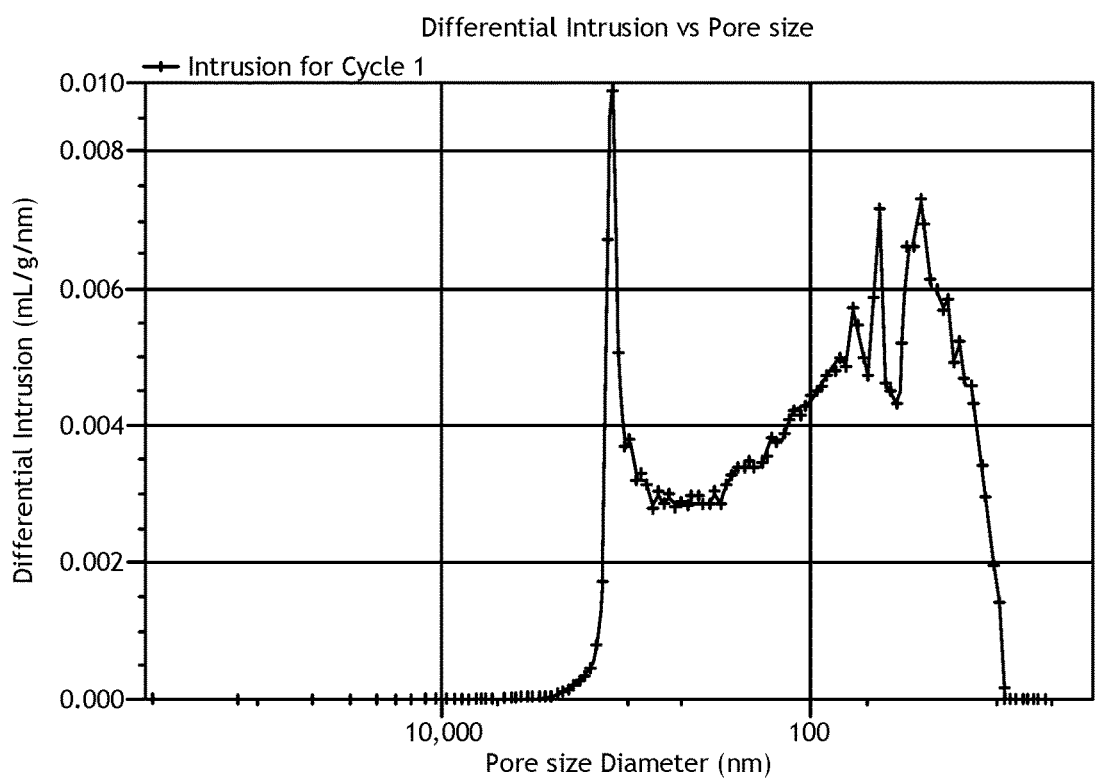
FIG. 10 is a distribution of pore size diameter for a second non-limiting aerogel of the present invention.

Preparation of a Highly Branched Polyimide Aerogel Monolith by Freeze Drying The resin (about 400 grams) prepared in Example 4 was mixed with 2-methylimidazole (about 53.34 grams) for five minutes and then benzoic anhydride (about 161.67 grams) for five minutes at a temperature of 18-35° C. After mixing, the resultant solution was poured into a square 3"×3" mold and placed in an oven at 75° C. for 30 minutes and then left overnight at room temperature. The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times The part was subsequently frozen on a shelf freezer, and subjected to subcritical drying for 96 hours in at 5° C., followed by drying in vacuum at 50° C. for 48 hours. The final recovered aerogel part had open-cell structure as observed by scanning electron microscopy (SEM) performed on a Phenom Pro Scanning Electron Microscope (Phenom-World, the Netherlands), exhibited a density of 0.15 g/cm$^3$ and porosity of 92.2% as measured according to ASTM D4404-10 with a Micromeritics® AutoPore V 9605 Automatic Mercury Penetrometer (Micromeritics® Instrument Corporation, U.S.A.). The distribution of pore sizes were measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 10. From the data, it was determined that the 96.3% of the shaped aerogel's pore volume was made up of pores having an average pore diameter of greater than 50 nm (e.g., from 5 nm to 50 nm), and thus a macroporously structured shaped aerogel was formed.

Example 6

Preparation of a Highly Branched Polyimide

TAPOB (about 2.05 g) was added to the reaction vessel charged with about 2,776.57 g DMSO as described in Example 1 at a temperature of 18-35° C. To the solution was added a first portion of DMB (about 33.54 g), followed by a first portion of ODA (about 31.63 g). After stirring for about 20 minutes, a first portion of PMDA (about 67.04 g)

was added. After stirring for about 20 minutes, TAPOB (about 2.05 g), DMB (about 33.54 g), and ODA (about 31.63 g) were added. After stirring for about 20 minutes, PMDA (about 67.04 g) was added. After stirring for about 20 minutes, TAPOB (about 2.05 g), DMB (about 33.54 g), and ODA (about 31.63 g) were added. After stirring for about 20 minutes, PMDA (about 67.04 g) was added. After stirring for about 8 hours, PA (about 18.12 g) was added. The resulting reaction mixture was stirred until no more solids were visible. After about 2 hours, the product was removed from the reaction vessel, filtered, and weighed.

Example 7

Preparation of a Highly Branched Polyimide Aerogel Monolith by Freeze Drying

Figure 11:
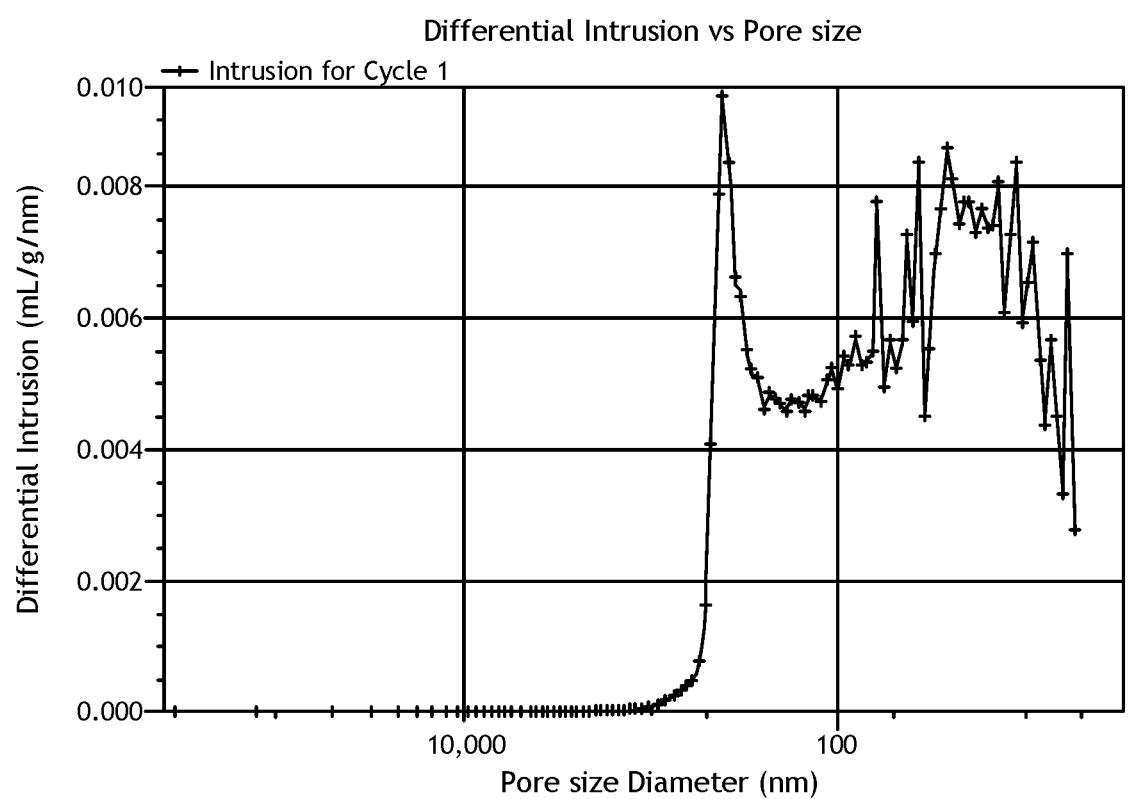
FIG. 11 is a distribution of pore size diameter for a third non-limiting aerogel of the present invention.

The resin (about 400 grams) prepared in Example 6 was mixed with 2-methylimidazole (about 40.38 grams) for five minutes and then benzoic anhydride (about 122.38 grams) for five minutes at a temperature of 18-35° C. After mixing, the resultant solution was poured into a square 3"×3" mold and placed in an oven at 75° C. for 30 minutes and then left overnight at room temperature. The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times The part was subsequently frozen on a shelf freezer, and subjected to subcritical drying for 96 hours in at 5° C., followed by drying in vacuum at 50° C. for 48 hours. The final recovered aerogel part had open-cell structure as observed by scanning electron microscopy (SEM) performed on a Phenom Pro Scanning Electron Microscope (Phenom-World, the Netherlands), exhibited a density of 0.23 g/cm³ and porosity of 82.7% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 11. From the data, it was determined that 90.6% of the shaped macroporously structured aerogel's pore volume was made up of pores having at least an average pore diameter greater than 50 nm.

Example 8

Preparation of a Highly Branched Polyamic Film

A reaction vessel with a mechanical stirrer and a water jacket was employed. The flow of the water through the reaction vessel jacket was adjusted to maintain temperature in the range of 20-28° C. The reaction vessel was charged with DMSO (108.2 lbs. 49.1 kg), and the mechanical stirrer speed was adjusted to 120-135 rpm. TAPOB (65.03 g) was added to the solvent. To the solution was added DMB (1,080.96 g), followed by ODA (1,018.73 g). A first portion of BPDA (1,524.71 g) was added. After stirring for 20 minutes, a sample of the reaction mixture was analyzed for viscosity. A second portion of BPDA (1,420.97 g) was added, and the reaction mixture was stirred for 20 additional minutes. A sample of the reaction mixture was analyzed for viscosity. A third portion of BPDA (42.81 g) was added, and the reaction mixture was stirred for 20 additional minutes. A sample of the reaction mixture was analyzed for viscosity. After stirring for 8 hours, PA (77.62 g) was added. The resulting reaction mixture was stirred until no more solid was visible. After 2 hours, the resin was removed from the reaction vessel, filtered, and weighed.

The resin (10,000 grams) was mixed with 2-methylimidazole (250 grams) for five minutes. Benzoic anhydride (945 grams) was added, and the solution mixed an additional five minutes. After mixing, the resultant solution was poured onto a moving polyester substrate that was heated in an oven at 100° C. for 30 seconds. The gelled film was collected and placed into an acetone bath. After immersion for 24 hours, the acetone bath was exchanged for fresh acetone. The soak and exchange process was repeated six times. After the final exchange, the gelled film was removed. The acetone solvent was evaporated under a stream of air at room temperature, and subsequently dried for 2 hrs hours at 200° C. The final recovered aerogel part had open-cell structure as observed by scanning electron microscopy (SEM) performed on a Phenom Pro Scanning Electron Microscope (Phenom-World, the Netherlands), exhibited a density of 0.20 g/cm³ and porosity of >80% as measured according to ASTM D4404-10 with a Micromeritics® AutoPore V 9605 Automatic Mercury Penetrometer (Micromeritics® Instrument Corporation, U.S.A.). The final recovered film exhibited a tensile strength and elongation of 1200 psi (8.27 MPa) and 14%, respectively, at room temperature as measured according to ASTM D882-02. The film had an average pore size of 400 nm.

The invention claimed is:

1. An evaporative air dried and thermally dried macroporous-structured polymeric organic aerogel in the form of a film having an organic polymeric matrix, wherein the polymeric organic aerogel has an average pore size of 250 nanometer (nm) to 750 nm, wherein at least 50% of the aerogel's pore volume is made up of pore sizes greater than 100 nm, wherein the polymeric organic aerogel is not-crosslinked, and wherein the evaporative air drying is at a temperature of 20° C. to 30° C. and the thermal drying is at a temperature of at least 50° C.

2. The macroporous-structured polymeric organic aerogel of claim 1, wherein at least 75% of the aerogel's pore volume is made up of pore sizes greater than 100 nm.

3. The macroporous-structured polymeric organic aerogel of claim 1, wherein at least 95% of the aerogel's pore volume is made up of pore sizes greater than 100 nm.

4. The macroporous-structured polymeric organic aerogel of claim 1, wherein the organic aerogel is a polyimide aerogel.

5. The macroporous-structured polymeric organic aerogel of claim 1,
wherein the aerogel is in the form of the film having a first surface and an opposing second surface,
wherein the aerogel is attached to a support layer having a first surface and an opposing second surface such that an interface is formed between a portion of the first surface of the aerogel film and a portion of the second surface of the support layer, and
wherein a majority of the volume of the aerogel film does not include the support layer.

6. The macroporous-structured polymeric organic aerogel of claim 5, wherein the support layer is a fiber support layer.

7. The macroporous-structured polymeric organic aerogel of claim 6, wherein the fiber support is a woven fiber support, a knitted fiber support, a non-woven fiber support, or a paper.

8. The macroporous-structured polymeric organic aerogel of claim 5, having a flex fatigue of at least 100,000 cycles to failure.

9. The macroporous-structured polymeric organic aerogel of claim 1, having a tensile strength of at least 15 MPa.

10. A method of making the macroporous-structured polymeric organic aerogel of claim 1, the method comprising:
   (a) providing a monomer or a combination of monomers to a solvent to form a solution;
   (b) polymerizing the monomers in the solution to form a polymer gel matrix; and
   (c) subjecting the polymer gel matrix to conditions sufficient to remove liquid from the polymer gel matrix to form an aerogel having macropores present in the aerogel matrix.

11. An article of manufacture comprising the macroporous-structured polymeric organic aerogel of claim 1.

12. The article of manufacture of claim 11, wherein the article of manufacture is a thin film, monolith, wafer, blanket, core composite material, a substrate for radiofrequency antenna, substrate for a sunshield, a substrate for a sunshade, a substrate for radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus, or any combination thereof.

13. The macroporous-structured polymeric organic aerogel of claim 1, wherein the film is rolled-up such that the film is in the form of a roll.

14. The macroporous-structured polymeric organic aerogel of claim 5, consisting of the polymeric organic aerogel film and the support layer.

15. The macroporous-structured polymeric organic aerogel of claim 5, wherein the entire interface is positioned within the volume of the polymeric organic aerogel film.

16. The macroporous-structured polymeric organic aerogel of claim 5, wherein the entire volume of the support layer is positioned within the volume of the polymeric organic aerogel film.

17. The macroporous-structured polymeric organic aerogel of claim 5, wherein a portion of the volume of the support layer is positioned within the volume of the polymeric organic aerogel film and a second portion of the volume of the support layer is positioned outside the volume of the polymeric organic aerogel film.

18. The macroporous-structured polymeric organic aerogel of claim 5, wherein the film is rolled-up such that the film is in the form of a roll.

\* \* \* \* \*